(12) United States Patent
Matoba et al.

(10) Patent No.: US 6,385,035 B1
(45) Date of Patent: *May 7, 2002

(54) DIELECTRIC CERAMIC COMPOSITION AND MONOLITHIC CERAMIC COMPONENT

(75) Inventors: Hiroaki Matoba, Moriyama; Harunobu Sano, Kyoto, both of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/657,198

(22) Filed: Sep. 7, 2000

(30) Foreign Application Priority Data

Sep. 7, 1999 (JP) ............................................. 11-253553
Sep. 7, 1999 (JP) ............................................. 11-253554
Sep. 27, 1999 (JP) ............................................ 11-272774

(51) Int. Cl.$^7$ ................................................. H01G 4/30
(52) U.S. Cl. ........................... 361/321.1; 361/321.2; 361/321.3; 361/321.4; 361/321.5; 501/134; 501/135; 501/136; 501/137; 501/138; 501/139; 428/209; 428/434; 428/469; 428/472; 428/702
(58) Field of Search ............................. 501/134–139; 361/321.1–321.5; 428/209, 701, 702, 472, 469, 434, 433, 432

(56) References Cited

U.S. PATENT DOCUMENTS

| | | | | | |
|---|---|---|---|---|---|
| 5,130,281 | A | * | 7/1992 | Sano et al. | 501/138 |
| 5,756,412 | A | * | 5/1998 | Lee et al. | 501/135 |
| 6,008,981 | A | * | 12/1999 | Harada et al. | 361/321.4 |
| 6,058,005 | A | * | 5/2000 | Matoba et al. | 361/321.4 |
| 6,195,250 | B1 | * | 2/2001 | Matoba et al. | 361/321.5 |

FOREIGN PATENT DOCUMENTS

| | | |
|---|---|---|
| EP | 0534802 A1 | 3/1993 |
| EP | 0851444 A2 | 7/1998 |
| EP | 0986076 A2 | 3/2000 |
| GB | 2308360 A | 6/1997 |
| JP | 5234420 | 9/1993 |
| JP | 5319920 | 12/1993 |
| JP | 8239262 | 9/1996 |

OTHER PUBLICATIONS

"A New $BaOTiO_2$ Compound with Temperature–Stable High Permittivity and Low Microwave Loss"; O'Bryan, et al.; *Journal of the American Ceramic Society*; vol. 57; 1974; pp. 450–453, no month.

* cited by examiner

Primary Examiner—Archene Turner
(74) Attorney, Agent, or Firm—Ostrolenk, Faber, Gerb & Soffen, LLP

(57) ABSTRACT

A dielectric ceramic composition comprises 100 parts by weight of a primary constituent, about 0.1 to 25 parts by weight of a first secondary constituent comprising a $SiO_2$-based glass not containing lead oxide, and about 20 parts by weight or less of a second secondary constituent comprising manganese oxide (MnO). The primary constituent is represented by the formula $x(Ba_\alpha Ca_\beta Sr_\gamma)O\text{-}y[(TiO_2)_{1-m}(ZrO_2)_m]\text{-}zRe_2O_3$ wherein $x+y+z=100$ on a molar basis, $\alpha+\beta+\gamma=1$, $0 \leq \beta+\gamma \leq 0.8$, $0<m<0.15$, and Re is at least one rare earth element. The mole fraction (x, y, z) of $(Ba_\alpha Ca_\beta Sr_\gamma)O$, $(TiO_2)_{1-m}(ZrO_2)_m$, and $Re_2O_3$ lies within a range surrounded by points in a ternary diagram, depending on the content of the ceramic capacitors. The dielectric ceramic composition can be sintered at low temperatures and exhibits a high specific dielectric constant and a high Q value. The dielectric ceramic composition is suitable for monolithic ceramic components such as monolithic ceramic capacitors and monolithic LC filters.

20 Claims, 4 Drawing Sheets

DIELECTRIC CERAMIC COMPOSITION AND MONOLITHIC CERAMIC COMPONENT

BACKGROUND OF THE INVENTION

1. Field of the Invention

The present invention relates to dielectric ceramic compositions for temperature compensation and relates to monolithic ceramic components, such as monolithic ceramic capacitors and monolithic LC filters, using the dielectric ceramic compositions.

2. Description of the Related Art

Ceramic capacitors for temperature compensation have been widely used for tuning and resonance in various electronic devices. Requirements for such capacitors are that they be compact and have low dielectric loss and stable dielectric characteristics. Thus, dielectric ceramics are required to have large dielectric constants and small dielectric loss (high Q values) under at reduced size.

BaO—$TiO_2$ dielectric ceramic compositions are disclosed as such dielectric ceramics (H. M. O'Brayan; J. Am. Ceram. Soc., 57, (1974), 450, and Japanese Examined Patent Application Publication No. 58-20905), and monolithic ceramic capacitors using these dielectric ceramic compositions are being used in practice. Since these dielectric ceramic compositions are sintered at high temperatures of 1,300° C. to 1,400° C., metals durable at high temperatures, such as palladium (Pd) and platinum (Pt) must be used as internal electrodes.

In recent years, dielectric ceramic compositions which can be sintered at low temperatures have been disclosed, for example, a dielectric ceramic composition composed of a BaO—$TiO_2$—$Nd_2O_3$-based primary constituent and a PbO—ZnO—$B_2O_3$—$Al_2O_3$—$SiO_2$ glass (Japanese Unexamined Patent Application Publication No. 5-234420); a dielectric ceramic composition composed of a BaO—$TiO_2$—$Nd_2O_3$-based primary constituent and a PbO—$V_2O_5$—$B_2O_3$—$SiO_2$ glass (Japanese Unexamined Patent Application Publication No. 8-239262); and a dielectric ceramic composition composed of a BaO—$TiO_2$—$Nd_2O_3$—$Sm_2O_3$-based primary constituent and a PbO—ZnO—$B_2O_3$ glass having a softening point of 500° C. or less (Japanese Unexamined Patent Application Publication No. 9-71462).

These dielectric ceramic compositions contain glasses containing lead oxide (PbO) to facilitate sintering at low temperatures. The lead oxide is highly volatile during sintering and results in variable lead oxide contents in the same lot or in different lots in glass production and sintering of ceramics. Thus, characteristics of the resulting ceramic compositions are variable.

As described in Japanese Unexamined Patent Application Publication No. 9-71462, most of lead-free glasses have softening points exceeding 500° C. and are unsuitable for sintering at low temperatures.

SUMMARY OF THE INVENTION

Accordingly, it is an object of the present invention to provide a dielectric ceramic composition for temperature compensation which has a high specific dielectric constant and a high Q value, can be sintered at low temperatures, can produce sintered ceramic having stable characteristics, and has high reliability.

It is another object of the present invention to provide a monolithic ceramic component, such as monolithic ceramic capacitor or a monolithic LC filter, using the monolithic ceramic component.

According to a first aspect of the present invention, a dielectric ceramic composition comprises 100 parts by weight of a primary constituent, about 0.1 to 25 parts by weight of a first secondary constituent comprising a $SiO_2$-based glass not containing lead oxide, and more than about 0.5 to about 20 parts by weight of a second secondary constituent comprising manganese oxide (MnO), wherein the primary constituent is represented by the formula $x(Ba_{60}Ca_\beta Sr_\gamma)O-y[(TiO_2)_{1-m}(ZrO_2)_m]-zRe_2O_3$ wherein x+y+z=100 on a molar basis, $\alpha+\beta+\gamma=1$, $0 \leq \beta+\gamma<0.8$, $0 \leq m<0.15$, and Re is at least one rare earth element, and the mole fraction (x, y, z) of $(Ba_\alpha Ca_\beta Sr_\gamma)O$, $(TiO_2)_{1-m}(ZrO_2)_m$, and $Re_2O_3$ lies within a range surrounded by point A (7, 85, 8), point B (7, 59, 34), point C (0, 59, 41) and point D (0, 85, 15) in a ternary diagram shown in FIG. 1 wherein the line AB is not included.

According to a second aspect of the present invention, a dielectric ceramic composition comprises 100 parts by weight of a primary constituent, about 0.1 to 25 parts by weight of a first secondary constituent comprising a $SiO_2$-based glass not containing lead oxide, and more than about 1.5 to about 20 parts by weight of a second secondary constituent comprising manganese oxide (MnO), wherein the primary constituent is represented by the formula $x(Ba_{\alpha Ca\beta}Sr_\gamma)O-y[(TiO_2)_{1-m}(ZrO_2)_m]-zRe_2O_3$ wherein x+y+z=100 on a molar basis, $\alpha+\beta+\gamma=1$, $0 \leq \beta+\gamma<0.8$, $0 \leq m<0.15$, and Re is at least one rare earth element, and the mole fraction (x, y, z) of $(Ba_\alpha Ca_\beta Sr_\gamma)O$, $(TiO_2)_{1-m}(ZrO_2)_m$, and $Re_2O_3$ lies within a range surrounded by point A' (10, 85, 5), point B' (10, 59, 31), point C' (7, 59, 34), and point D' (7, 85, 8) in a ternary diagram shown in FIG. 2 wherein the line AB is not included.

According to a third aspect of the present invention, a dielectric ceramic composition comprises 100 parts by weight of a primary constituent, about 0.1 to 25 parts by weight of a first secondary constituent comprising a $SiO_2$-based glass not containing lead oxide, and more than about 3.0 to 20 parts by weight of a second secondary constituent comprising manganese oxide (MnO), wherein the primary constituent is represented by the formula $x(Ba_\alpha Ca_\beta Sr_\gamma)O-y[(TiO_2)_{1-m}(ZrO_2)_m]-zRe_2O_3$ wherein x+y+z=100 on a molar basis, $\alpha+\beta+\gamma=1,0 \leq \beta+\gamma<0.8$, $0 \leq m<0.15$, and Re is at least one rare earth element, and the mole fraction (x, y, z) of $(Ba_\alpha Ca_\beta Sr_\gamma)O$, $(TiO_2)_{1-m}(ZrO_2)_m$, and Re2O3 lies within a range surrounded by point A" (30, 70, 0), point B" (30, 59, 11), point C" (10, 59, 31), point D" (10, 85, 5), and point E" (15, 85, 0) in a ternary diagram shown in FIG. 3.

In the first to third aspects, the first secondary constituent preferably comprises a $B_2O_3$—$SiO_2$-based glass not containing lead oxide.

In these aspects, the dielectric ceramic composition preferably further comprises about 10 parts by weight or less of copper oxide (CuO) as a third secondary constituent.

According to a fourth aspect, a monolithic ceramic component comprises a plurality of dielectric ceramic layers, internal electrodes formed among the dielectric ceramic layers, and external electrodes connected to the internal electrodes, wherein the dielectric ceramic layers comprise the dielectric ceramic composition according to any one of the first to third aspects, and the internal electrodes comprise one of Cu and Ag as a primary constituent.

Examples of the rare earth elements Re in the present invention include La, Ce, Pr, Nd, Pm, Sm, Eu, Gd, Tb, Dy, Ho, Er, Tm, Yb, and Lu.

The dielectric ceramic composition in accordance with the present invention can be sintered at a temperature of 1,060° C. or less, and has a specific dielectric constant of 30 or more in the first aspect, 50 or more in the second aspect, or 60 or more in the second aspect, a Q value of 1,000 or more at 1 MHZ, and a temperature coefficient of capacitance (TCC) of ±30 ppm/°C. in the first aspect, ±60 ppm/°C. in the second aspect, or ±120 ppm/°C. in the third aspect. Since the composition does not contain volatile lead oxide, characteristics of the dielectric ceramic composition are stabilized.

A monolithic ceramic component, such as a monolithic ceramic capacitor or a monolithic LC filter, including dielectric ceramic layers composed of the dielectric ceramic composition, exhibits high moisture resistance. Moreover, inexpensive electrode materials, such as copper and silver, can be used in the monolithic ceramic component of the present invention. Thus, the monolithic ceramic component can be produced at reduced material cost.

DESCRIPTION OF THE PREFERRED EMBODIMENTS

Figure 4:
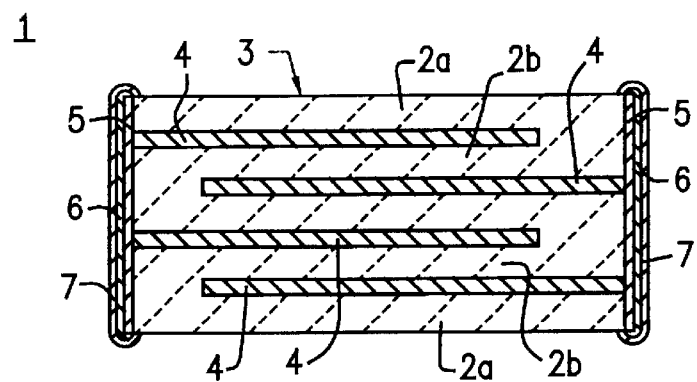
FIG. 4 is a cross-sectional view of a monolithic ceramic capacitor in accordance with an embodiment of the present invention.
Figure 5:
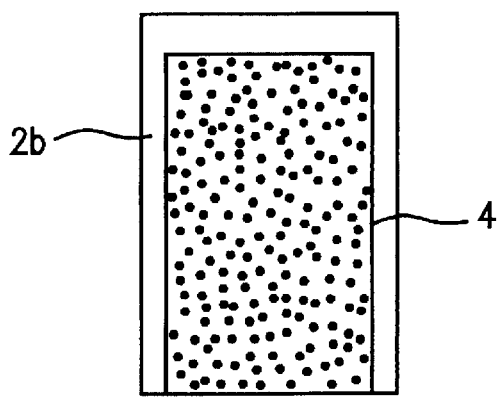
FIG. 5 is a plan view of a dielectric ceramic layer having an internal electrode in the monolithic ceramic capacitor shown in FIG. 4.
Figure 6:
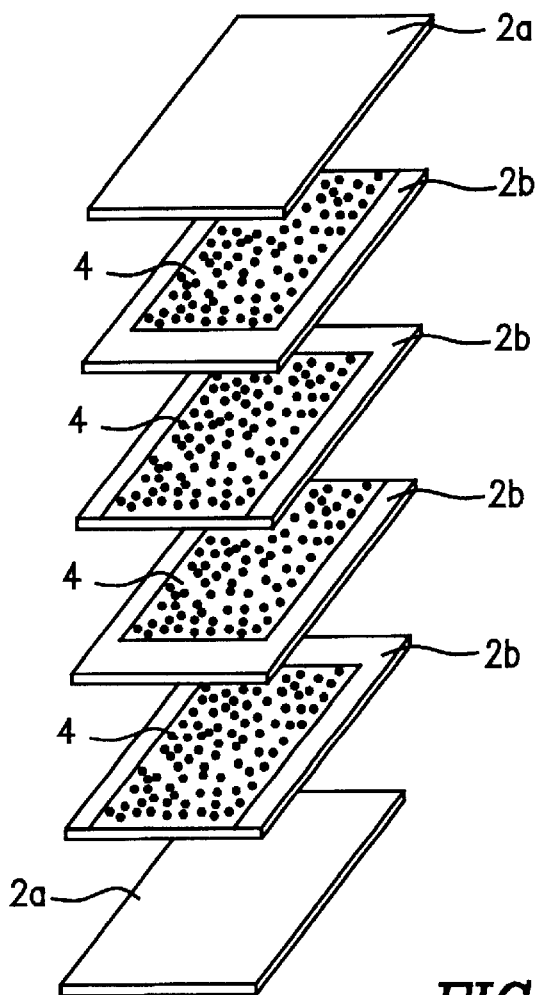
FIG. 6 is an exploded isometric view of ceramic layers in the monolithic ceramic capacitor shown in FIG. 4.

A basic structure of a monolithic ceramic capacitor in accordance with an embodiment of the present invention will now be described with reference to the drawings. FIG. 4 is a cross-sectional view of the monolithic ceramic capacitor, FIG. 5 is a plan view of a dielectric ceramic layer having an internal electrode in the monolithic ceramic capacitor shown in FIG. 4, and FIG. 6 is an exploded isometric view of ceramic layers in the monolithic ceramic capacitor shown in FIG. 4.

With reference to FIG. 4, a monolithic ceramic capacitor 1 in this embodiment includes a rectangular parallelepiped ceramic composite 3 which is formed by laminating a plurality of dielectric ceramic layers 2a and 2b and internal electrodes 4 among the dielectric ceramic layers 2a and 2b. The ceramic composite 3 is provided with external electrodes 5 on both side faces thereof. In addition, first plating layers 6 and second plating layers 7 may be formed thereon, if necessary. Each of the external electrodes 5 is electrically connected to predetermined internal electrodes 4.

A method for making the monolithic ceramic capacitor 1 will now be described.

A powdered mixture having a predetermined composition is prepared for the dielectric ceramic layers 2a and 2b. This mixture contains a $BaO$—$TiO_2$—$Re_2O_3$-based primary constituent, and a $SiO_2$-based or $B_2O_3$—$SiO_2$-based glass as a first secondary constituent not containing lead oxide, and a MnO second secondary constituent. In the primary constituent, Ba may be replaced with Ca or Sr, and $TiO_2$ may be replaced with $ZrO_2$. Preferably, the powder mixture further contains copper oxide (Cu) as a third secondary constituent.

An organic binder is added to the powder mixture to form a slurry. The slurry is spread to form green sheets for the dielectric ceramic layers 2a and 2b. As shown in FIG. 5, an internal electrode 4 primarily composed of Cu or Ag is formed on one surface of each of the green sheets by screen-printing, deposition or plating. The green sheets provided with the internal electrodes 4 are used as the dielectric ceramic layers 2b.

With reference to FIG. 6, a required number of the green sheets with the internal electrodes 4 are laminated, and the laminate is disposed between two green sheets to be used as the dielectric ceramic layers 2a having no internal electrode. These green sheets were pressed to form a green composite. The green composite is sintered at a predetermined temperature to form a ceramic composite 3 shown in FIG. 4.

External electrodes 5 are formed on both side ends of the ceramic composite 3 so that the external electrodes 5 are electrically connected to the internal electrodes 4. The material for the external electrodes 5 may be the same as that for the internal electrodes 4. For example, a silver-palladium alloy is usable. Alternatively, the material may be composed of a powder of the alloy and frit composed of a $B_2O_3$—$SiO_2$—$BaO$-based glass or $Li_2O$—$SiO_2$—$BaO$-based glass. A suitable material may be determined in consideration of the use, the operational environment, and the like of the monolithic ceramic capacitor. The external electrodes 5 are formed by applying and baking a powdered metal paste onto the ceramic composite 3. Alternatively, the paste may be applied onto the green composite and may be sintered together with the green composite to form the ceramic composite 3.

The first plating layers 6 composed of nickel or copper are formed on the external electrodes 5 and the second plating layers 7 composed of solder or tin are formed on the first plating layers 6. The monolithic ceramic capacitor 1 is thereby fabricated. The first plating layers 6 and the second plating layers 7 may be omitted according to the intended use and operational environment of the monolithic ceramic capacitor.

As described above, the dielectric ceramic composition of the present invention used as the dielectric members of the monolithic ceramic capacitor can be sintered at a low temperature which is lower than the melting points of Cu and Ag. The resulting dielectric ceramic composition has a specific dielectric constant of 30 or more in the first aspect, 50 or more in the second aspect, or 60 or more in the third aspect, a Q value of 1,000 or more at 1 MHZ, and a small temperature coefficient of capacitance (TCC) of ±30 ppm/° C. in the first aspect, ±60 ppm/° C. in the second aspect, or ±120 ppm/° C. in the third aspect. When the first secondary constituent comprises the $B_2O_3$—$SiO_2$-based glass not containing lead oxide, sintering is facilitated at low temperatures. The copper oxide third secondary constituent further facilitates sintering at low temperatures.

EXAMPLES

The present invention will be described in more detail.

Example 1

Dielectric ceramic compositions in accordance with the first aspect of the present invention and ceramic capacitors formed thereof were prepared as follows.

As starting powdered materials, barium carbonate ($BaCO_3$), calcium carbonate ($CaCO_3$), strontium carbonate ($SrCO_3$), titanium oxide ($TiO_2$), zirconium oxide ($ZrO_2$), rare earth oxides ($Re_2O_3$), manganese carbonate ($MnCO_3$) and copper oxide ($CuO$) were prepared.

These powdered materials were wet-mixed with ethanol in a ball mill for 16 hours, according to the formulations for the primary constituent, the second secondary constituent, and the third secondary constituent shown in Tables 1 and 2 to form slurries, and the slurries were dried. The dried mixtures were pulverized and calcined at 1,040° C. to form calcined powders. Each calcined powder had an average diameter of 0.9 $\mu$m. In Tables 1 and 2, the MnO content as the second secondary constituent and the CuO content as the third secondary constituent were represented by parts by weight to 100 parts by weight of the primary constituent $\{x(Ba_\alpha Ca_\beta Sr_\gamma)O\text{-}y[(TiO_2)_{1-m}(ZrO_2)_m]\text{-}zRe_2O_3\}$ wherein x+y+z=100 on a molar basis, $\alpha+\beta+\gamma=1$, $0\leq\beta+\gamma<0.8$, $0\leq m<0.15$, and Re was at least one rare earth element. In Tables 1 and 2, asterisked sample numbers indicate that the samples are outside of the scope of the present invention, whereas the other samples are within the scope of the present invention.

TABLE 1

| | $x(Ba_\alpha Ca_\beta Sr_\gamma)O\text{-}y[(TiO_2)_{1-m}(ZrO_2)_m]\text{-}zRe_2O_3$ | | | | | | | First Secondary Constituent $SiO_2$ - based Glass (a) | | Second Secondary Constituent |
|---|---|---|---|---|---|---|---|---|---|---|
| Sample No. | x (mol %) | $\alpha$ | $\beta$ | $\gamma$ | y (mol %) | m | z (mol %) | Molar Ratio of Rare Earth Elements | Glass Type | MnO (b) Parts by weight |
| *1 | 3 | 0.95 | 0.05 | 0 | 91 | 0.02 | 6 | Nd/Er/Sm = 80/15/5 | A | 6 | 1 |
| *2 | 2 | 0.95 | 0.05 | 0 | 55 | 0.02 | 43 | Nd/Er/Sm = 80/15/5 | A | 6 | 1 |
| *3 | 7 | 0.95 | 0.05 | 0 | 78 | 0.02 | 15 | Nd/Er/Sm = 80/15/5 | A | 6 | 1 |
| *4 | 7 | 0.95 | 0.05 | 0 | 66 | 0.62 | 27 | Nd/Er/Sm = 80/15/5 | A | 6 | 1 |
| 5 | 3 | 1 | 0 | 0 | 59 | 0 | 38 | Nd/Sm/Er = 40/40/20 | F | 10 | 0.6 |
| 6 | 3 | 0.6 | 0.2 | 0.2 | 59 | 0 | 38 | Nd/Sm/Er = 40/40/20 | F | 10 | 0.6 |
| 7 | 3 | 0.4 | 0.3 | 0.3 | 59 | 0 | 38 | Nd/Sm/Er = 40/40/20 | F | 10 | 0.6 |
| *8 | 3 | 0.2 | 0.4 | 0.4 | 59 | 0 | 38 | Nd/Sm/Er = 40/40/20 | F | 10 | 0.6 |
| 9 | 3 | 1 | 0 | 0 | 59 | 0 | 38 | Nd = 100 | G | 10 | 0.8 |
| 10 | 3 | 1 | 0 | 0 | 59 | 0.05 | 38 | Nd = 100 | G | 10 | 0.8 |
| *11 | 3 | 1 | 0 | 0 | 59 | 0.15 | 38 | Nd = 100 | G | 10 | 0.8 |
| *12 | 6 | 0.8 | 0.1 | 0.1 | 74 | 0 | 20 | Nd/Pr = 95/5 | A | 0 | 0 |
| *13 | 6 | 0.8 | 0.1 | 0.1 | 74 | 0 | 20 | Nd/Pr = 95/5 | A | 10 | 0 |
| *14 | 6 | 0.8 | 0.1 | 0.1 | 74 | 0 | 20 | Nd/Pr = 95/5 | A | 0 | 1 |
| *15 | 5 | 0.8 | 0.05 | 0.15 | 59 | 0.03 | 36 | Sm/Dy/Er = 50/30/20 | D | 0 | 3 |
| 16 | 5 | 0.8 | 0.05 | 0.15 | 59 | 0.03 | 36 | Sm/Dy/Er = 50/30/20 | D | 0.1 | 3 |
| 17 | 5 | 0.8 | 0.05 | 0.15 | 59 | 0.03 | 36 | Sm/Dy/Er = 50/30/20 | D | 5 | 3 |
| 18 | 5 | 0.8 | 0.05 | 0.15 | 59 | 0.03 | 36 | Sm/Dy/Er = 50/30/20 | D | 26 | 3 |
| *19 | 5 | 0.8 | 0.05 | 0.15 | 59 | 0.03 | 36 | Sm/Dy/Er = 50/30/20 | D | 30 | 3 |
| 20 | 5 | 1 | 0 | 0 | 59 | 0 | 36 | Nd/Dy/La = 90/5/5 | E | 5 | 0.6 |
| 21 | 5 | 0.9 | 0.1 | 0 | 59 | 0.01 | 36 | Nd/Sm = 60/40 | I | 10 | 0.6 |
| *22 | 5 | 0.9 | 0.1 | 0 | 59 | 0.01 | 36 | Nd/Sm = 60/40 | C | 10 | 0.5 |
| 23 | 5 | 0.9 | 0.1 | 0 | 59 | 0.01 | 36 | Nd/Sm = 60/40 | C | 10 | 0.6 |
| 24 | 5 | 0.9 | 0.1 | 0 | 59 | 0.01 | 36 | Nd/Sm = 60/40 | C | 10 | 5 |
| 25 | 5 | 0.9 | 0.1 | 0 | 59 | 0.01 | 36 | Nd/Sm = 60/40 | C | 10 | 20 |
| *26 | 5 | 0.9 | 0.1 | 0 | 59 | 0.01 | 36 | Nd/Sm = 60/40 | C | 10 | 25 |
| 27 | 6 | 0.8 | 0.1 | 0.1 | 74 | 0 | 20 | Nd/Pr = 95/5 | B | 10 | 2 |
| 28 | 6 | 0.8 | 0.1 | 0.1 | 74 | 0 | 20 | Nd/Pr = 95/5 | A | 10 | 2 |

TABLE 2

| | $x(Ba_\alpha Ca_\beta Sr_\gamma)O\text{-}y[(TiO_2)_{1-m}(ZrO_2)_m]\text{-}zRe_2O_3$ | | | | | | | First Secondary Constituent $SiO_2$ - based Glass | | Second Secondary Constituent MnO (b) | Third Secondary Constituent CuO (c) |
|---|---|---|---|---|---|---|---|---|---|---|---|
| Sample No. | x (mol %) | $\alpha$ | $\beta$ | $\gamma$ | y (mol %) | m | z (mol %) | Molar Ratio of Rare Earth Elements | Glass Type | Parts by Weight | |
| 29 | 6 | 0.95 | 0.05 | 0 | 74 | 0.02 | 20 | Nd/Er/Sm = 80/15/5 | A | 6 | 1 | 2 |
| 30 | 5 | 0.95 | 0.05 | 0 | 70 | 0.02 | 25 | Nd/Er/Sm = 80/15/5 | A | 6 | 1 | 2 |
| 31 | 2 | 0.95 | 0.05 | 0 | 76 | 0.02 | 22 | Nd/Er/Sm = 80/15/5 | A | 6 | 1 | 2 |
| 32 | 4 | 0.95 | 0.05 | 0 | 85 | 0.02 | 11 | Nd/Er/Sm = 80/15/5 | A | 6 | 1 | 2 |
| 33 | 3 | 0.95 | 0.05 | 0 | 59 | 0.02 | 38 | Nd/Er/Sm = 80/15/5 | A | 6 | 1 | 2 |
| 34 | 0 | 0.95 | 0.05 | 0 | 68 | 0.02 | 32 | Nd/Er/Sm = 80/15/5 | A | 6 | 1 | 2 |
| 35 | 5 | 1 | 0 | 0 | 59 | 0 | 36 | Nd/Dy/La = 90/5/5 | E | 5 | 0.6 | 1 |
| 36 | 5 | 1 | 0 | 0 | 59 | 0 | 36 | Nd/Dy/La = 90/5/5 | E | 5 | 0.6 | 10 |
| *37 | 5 | 1 | 0 | 0 | 59 | 0 | 36 | Nd/Dy/La = 90/5/5 | E | 5 | 0.6 | 15 |

Moreover, $SiO_2$-based glass powders and $B_2O_3$—$SiO_2$-based glass powders composed of glass types A to G and I were prepared as first secondary constituents according to the formulations shown in Table 3 in which the coefficient of each oxide was represented by percent by weight.

TABLE 3

| Glass Type | Composition (Percent by weight) |
|---|---|
| A | $33B_2O_3$-$47SiO_2$-$17BaO$-$3Al_2O_3$ |
| B | $50SiO_2$-$30Li_2O$-$17BaO$-$3Al_2O_3$ |
| C | $25B_2O_3$-$35SiO_2$-$40BaO$ |
| D | $15B_2O_3$-$15SiO_2$-$60BaO$-$5Li_2O$-$5Al_2O_3$ |
| E | $17B_2O_3$-$17SiO_2$-$46BaO$-$10CaO$-$10SrO$ |
| F | $35B_2O_3$-$30SiO_2$-$35ZnO$ |
| G | $18B_2O_3$-$19SiO_2$-$60BaO$-$3Li_2O$ |
| H | $15B_2O_3$-$85SiO_2$ |
| I | $60SiO_2$-$20Li_2O$-$15CaO$-$5Al_2O_3$ |

The calcined powders and glass powders were mixed with a polyvinyl butyral solution to form slurries, according to the formulations shown in Tables 1 and 2. Each slurry was spread by a doctor blade method to form green sheets, each having a thickness of 50 µm. The glass content is represented by parts by weight to 100 parts by weight of the primary constituent.

Next, 13 green sheets were laminated, were pressed, and were cut by punching into a green composite having a diameter of 14 mm and a thickness of 0.5 mm. The green composite was heated at 350° C. in a nitrogen atmosphere to remove the binder, and was sintered at a sintering temperature shown in either Table 4 or 5 for 3 hours in a hydrogen-nitrogen-hydrogen oxide-based reducing atmosphere to form a disk-like ceramic composite. In—Ga electrodes were formed by coating on noth main surfaces of the resulting ceramic composite to form a single-layered ceramic capacitor.

TABLE 4

| Sample No. | Sintering Temperature (° C.) | Specific Dielectric Constant 1 MHz | Q 1 MHz | TCC (ppm/° C.) |
|---|---|---|---|---|
| *1 | 1060 | 36 | 700 | −47 |
| *2 | 1060 | | Not Sintered | |
| *3 | 1060 | 54 | 2200 | −42 |
| *4 | 1060 | 53 | 200 | −48 |
| 5 | 1040 | 42 | 2200 | −24 |
| 6 | 1050 | 44 | 2200 | −26 |
| 7 | 1060 | 46 | 2000 | −28 |
| *8 | 1060 | | Not Sintered | |
| 9 | 1030 | 43 | 2800 | −25 |
| 10 | 1050 | 44 | 3000 | −25 |
| *11 | 1060 | | Not Sintered | |
| *12 | 1060 | | Not Sintered | |
| *13 | 1060 | | Not Sintered | |
| *14 | 1060 | | Not Sintered | |
| *15 | 1060 | | Not Sintered | |
| 16 | 1060 | 41 | 3800 | −24 |
| 17 | 1040 | 45 | 3500 | −28 |
| 18 | 1000 | 43 | 3400 | −29 |
| *19 | 980 | 40 | 600 | −40 |
| 20 | 1060 | 48 | 3700 | −19 |
| 21 | 1060 | 47 | 2900 | −23 |
| *22 | 1060 | 48 | 2800 | −32 |
| 23 | 1050 | 48 | 3400 | −20 |
| 24 | 980 | 47 | 3700 | −18 |
| 25 | 950 | 45 | 3100 | 24 |
| *26 | 940 | 45 | 800 | 32 |
| 27 | 1060 | 48 | 1800 | −29 |
| 28 | 1030 | 48 | 1500 | −25 |

TABLE 5

| Sample No. | Sintering Temperature (° C.) | Specific Dielectric Constant 1 MHz | Q 1 MHz | TCC (ppm/° C.) |
|---|---|---|---|---|
| 29 | 1030 | 49 | 3800 | −27 |
| 30 | 1030 | 47 | 3600 | −18 |
| 31 | 1030 | 42 | 3300 | 28 |
| 32 | 1030 | 38 | 3100 | −28 |
| 33 | 1030 | 39 | 3200 | −26 |
| 34 | 1030 | 35 | 3500 | 29 |
| 35 | 1000 | 49 | 3500 | −11 |
| 36 | 950 | 48 | 2600 | 14 |
| *37 | 950 | 47 | 700 | 36 |

Electrical characteristics of each ceramic capacitor were measured. The electrostatic capacitance and the Q value were measured at 20° C., a frequency of 1 MHZ, and a voltage of 1 Vrms. The specific dielectric constant (∈r) was calculated from the diameter (D) and the thickness (T) of the sample and the electrostatic capacitance. The TCC was calculated using the equation (1):

$$TCC = \{(Cap85 - Cap20)/[Cap20 \times (85-20)]\} \times 10^6 \text{ [ppm/° C.]} \quad (1)$$

wherein Cap20 indicated the electrostatic capacitance [pF] at 20° C. and Cap85 indicated the electrostatic capacitance [pF] at 85° C.

The results are shown in Tables 4 and 5. In Tables 4 and 5, asterisked sample numbers indicate that the samples are outside of the scope of the present invention, whereas the other samples are within the scope of the present invention.

As shown in Tables 1 and 4, the ceramic capacitors in accordance with the first aspect of the present invention have the compositions represented by sample Nos. 5 to 7, 10, 16 to 18, 20, 21, 23 to 25, 27 and 28, each composed of the primary constituent, the $SiO_2$-based glass not containing lead oxide as the first secondary constituent and manganese oxide as the second secondary constituent. Each dielectric ceramic capacitor has a specific dielectric constant of as high as 30 or more, a Q value of as high as 1,000 or more at 1 MHZ, and a TCC of as small as within ±30 ppm/° C. Moreover, the dielectric ceramic composition can be sintered at 1,060° C. or less which is lower than the melting point (1,083° C.) of copper.

As shown in sample Nos. 21, 23, 27 and 28, when the first secondary constituent is a $B_2O_3$—$SiO_2$-based glass not containing lead oxide, sintering of the dielectric ceramic at a low temperature is facilitated.

As shown in sample Nos. 35 and 36 in Tables 2 and 5, when CuO as the third secondary constituent is present, sintering of the dielectric ceramic at a low temperature is further facilitated. Since none of the compositions contain volatile lead oxide, the ceramic composition can be sintered without fluctuation of various characteristics.

Reasons for limitation of the composition in the first aspect of the present invention will now be described.

Figure 1:
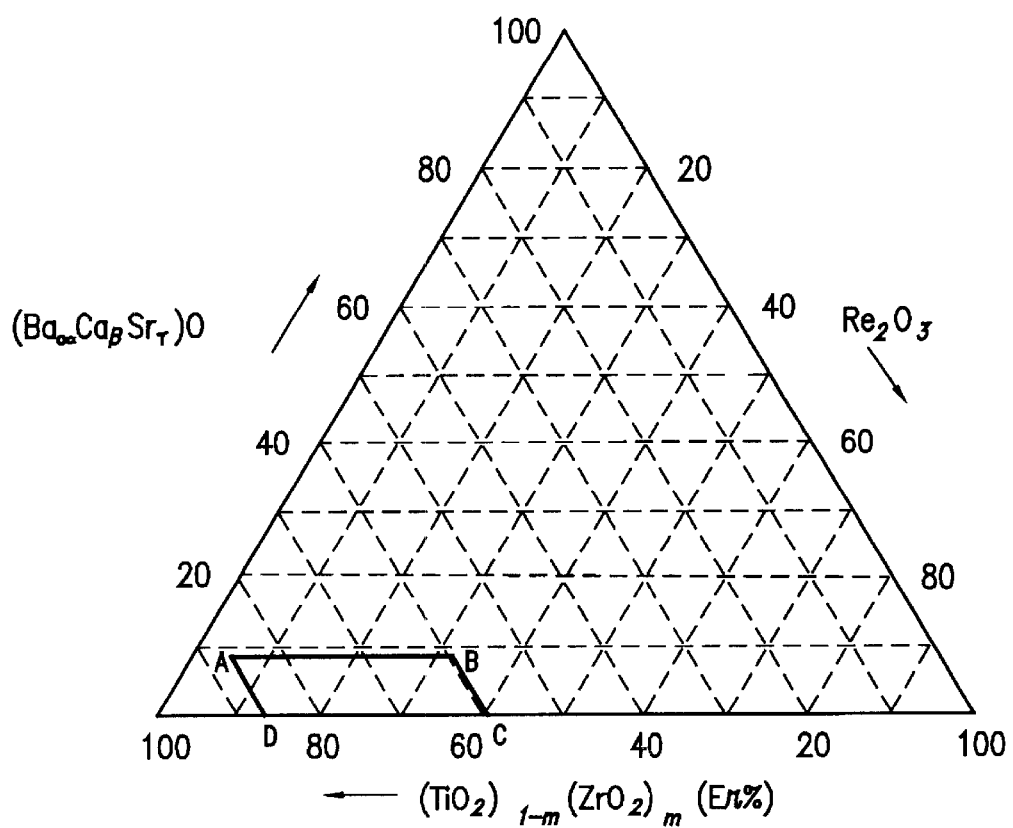
FIG. 1 is a ternary diagram showing the range of the preferable mole fraction of $(Ba_\alpha Ca_\beta Sr_\gamma)O$, $(TiO_2)_{1-m}$ $(ZrO_2)_m$, and $Re_2O_3$ in a primary constituent in a dielectric ceramic composition in accordance with a first aspect of the present invention.

As in sample Nos. 1 to 4 shown in Tables 1 and 4, when the mole fraction (x, y, z) of $(Ba_\alpha Ca_\beta Sr_\gamma)O$, $(TiO_2)_{1-m}$ $(ZrO_2)_m$, and $Re_2O_3$ in the primary constituent, which is represented by the formula $x(Ba_\alpha Ca_\beta Sr_\gamma)O$-$y[(TiO_2)_{1-m}(ZrO_2)_m]$-$zRe_2O_3$ wherein $x+y+z=100$ on a molar basis, $\alpha+\beta+\gamma=1$, $0 \leq \beta+\gamma<0.8$, $0 \leq m<0.15$, and Re is at least one rare earth element, does not lie within a range surrounded by point A (7, 85, 8), point B (7, 59, 34), point C (0, 59, 41) and point D (0, 85, 15) in a ternary diagram shown in FIG. 1, the TCC is outside of the range of ±30 ppm/° C., the ceramic composition cannot be sintered at 1,060° C. which is lower than the melting point 1,083° C. of copper, or the Q value is less than 1,000. Thus, the mole fraction (x, y, z) in the primary constituent preferably lies within the range surrounded by point A (7, 85, 8), point B (7, 59, 34), point C (0, 59, 41), and point D (0, 85, 15) in the ternary diagram shown in FIG. 1 wherein the line AB is not included. When the total mole fraction x of Ba, Ca, and Sr exceeds 7, the TCC is outside of the range of ±30 ppm/° C. Thus, the preferable range of x is $0 \leq x < 7$. When the total mole fraction y of Ti and Zr is less than 59, the composition cannot be sintered at 1,060° C. due to low sinterability. When the total mole fraction y exceeds 85, the Q value is less than 1,000. Thus, the preferable range of y is $59 \leq y < 85$.

When Ba is partly replaced with Ca and Sr as shown in sample Nos. 5 to 7, the dielectric constant increases. When the total fraction ($\beta+\gamma$) of Ca and Sr, however, is 0.8 or more as shown in sample No. 8, the composition cannot be sintered at 1,060° C. Thus, the preferable total fraction is in a range of $0 \leq \beta+\gamma < 0.8$.

As starting powdered materials, barium carbonate ($BaCO_3$), calcium carbonate ($CaCO_3$), strontium carbonate ($SrCO_3$), titanium oxide ($TiO_2$), zirconium oxide ($ZrO_2$), rare earth oxides ($Re_2O_3$), manganese carbonate ($MnCO_3$), and copper oxide (CuO) were prepared.

These powdered materials were wet-mixed with ethanol in a ball mill for 16 hours, according to the formulation for the primary constituent, the second secondary constituent and the third secondary constituent shown in sample No. 41 in Table 6 to form slurry, and the slurry was dried. The dried mixture was calcined at 1,040° C. to form a calcined powder. In Table 6, the MnO content as the second secondary constituent and the CuO content as the third secondary constituent were represented by parts by weight to 100 parts by weight of the primary constituent $\{x(Ba_\alpha Ca_\beta Sr_\gamma)O\text{-}y[(TiO_2)_{1-m}(ZrO_2)_m]\text{-}zRe_2O_3\}$ wherein x+y+z=100 on a molar basis, $\alpha+\beta+\gamma=1$, $0 \leq \beta+\gamma < 0.8$, $0 \leq m < 0.15$, and Re was at least one rare earth element. In Table 6, the asterisked sample number indicates that the sample is outside of the scope of the present invention.

TABLE 6

| Sample No. | $x(Ba_\alpha Ca_\beta Sr_\gamma)O\text{-}y[(TiO_2)_{1-m}(ZrO_2)_m]\text{-}zRe_2O_3$ | | | | | | | First Secondary Constituent | | Second Secondary Constituent | Third Secondary Constituent | | |
|---|---|---|---|---|---|---|---|---|---|---|---|---|---|
| | x (mol %) | α | β | γ | y (mol %) | m | z | Molar Ratio of Rare Earth Elements | $SiO_2$ - based Glass Glass Type | MnO (b) | CuO (c) | $B_2O_3$ | $SiO_3$ |
| | | | | | | | | | | Parts by Weight | | | |
| 41 | 5 | 0.9 | 0.05 | 0.05 | 70 | 0.01 | 25 | Er/Nd/Pr = 70/25/5 | H | 10 | 2 | 1 | 0 | 0 |
| *42 | 5 | 0.9 | 0.05 | 0.05 | 70 | 0.01 | 25 | Er/Nd/Pr = 70/25/5 | — | 0 | 2 | 1 | 1.5 | 8.5 |

When $TiO_2$ is partly replaced with $ZrO_2$, reduction of the oxides in the primary constituent is prevented. Thus, the ceramic composition and a copper conductor can be simultaneously sintered in a reducing atmosphere. When the $ZrO_2$ fraction m exceeds 0.15 as shown in sample No. 11, the composition cannot be sintered at 1,060° C. Thus, the preferable $ZrO_2$ fraction is in a range of $0 \leq m < 0.15$.

When the composition contains lead-free glass as the first secondary constituent as shown in sample Nos. 16 to 18, sinterability is improved. When the glass content a is less than 0.1 parts by weight as shown in sample No. 15, the composition cannot be sintered at 1,060° C. When the glass content a exceeds 25 as shown in sample No. 19, the Q value is less than 1,000. Thus, the preferable glass content a is in a range of $0.1 \leq a \leq 25$.

When the composition contains MnO as the second secondary constituent as shown in sample Nos. 23 to 25, sinterability is improved and the TCC is reduced and is shifted to the positive side. When the MnO content b is 0.5 parts by weight or less as shown in sample No. 22, the TCC is outside of the range of ±30 ppm/° C. When the Mn content b exceeds 20 parts by weight as shown in sample No. 26, the Q value is less than 1,000. Thus, the preferable Mn content b is in a range of $0.5 < b \leq 20$.

Copper oxide (CuO) as the third secondary constituent contributes to improvement in sinterability. When the CuO content c exceeds 10 parts by weight as shown in sample No. 37 in Tables 2 and 5, the Q value is less than 1,000. Thus, the preferable CuO content c is in a range of $c \leq 10$.

Example 2

A monolithic ceramic capacitor in accordance with the first aspect of the present invention was prepared as follows.

Moreover, a glass powder of glass type H ($15B_2O_3$—$85SiO_2$) was prepared as the first secondary constituent according to the formulation shown in Table 3 in which the coefficient of each oxide was represented by percent by weight.

Next, 100 parts by weight of the calcined powder and 10 parts by weight of the glass powder were mixed with a polyvinyl butyral solution to form a slurry. The slurry was spread by a doctor blade method to form green sheets.

A conductive paste layer was formed on each green sheet by printing a conductive paste primarily composed of copper to form an internal electrode. A plurality of the green sheets provided with the internal electrodes were laminated so that the conductive paste layers were alternately exposed at both side faces of the laminate, and a conductive paste primarily composed of copper was applied to both side faces of the laminate to form a green composite. The green composite was heated at 350° C. in a nitrogen atmosphere to remove the binder, and was sintered at 1,000° C. for 2 hours in a hydrogen-nitrogen-hydrogen oxide-based reducing atmosphere to form a monolithic ceramic capacitor.

The resulting monolithic ceramic capacitor had a width of 1.6 mm, a length of 3.2 mm and a thickness of 1.2 mm. The thickness of the dielectric ceramic layer among the internal electrodes was 6 μm. The number of the effective dielectric ceramic layers was 150.

As a comparative example, a monolithic ceramic capacitor using a dielectric composition shown in sample No. 42 in Table 6 was prepared as follows.

As starting powdered materials, barium carbonate ($BaCO_3$), calcium carbonate ($CaCO_3$), strontium carbonate ($SrCO_3$), titanium oxide ($TiO_2$), zirconium oxide ($ZrO_2$), rare earth oxides ($Re_2O_3$), manganese carbonate ($MnCO_3$), copper oxide (CuO), boron oxide ($B_2O_3$) and silicon oxide ($SiO_2$) were prepared.

These powdered materials were wet-mixed with ethanol in a ball mill for 16 hours, according to the formulation for the primary constituent, the second secondary constituent, and the third secondary constituent shown in sample No. 42 in Table 6 to form slurry, and the slurry was dried. The dried mixture was calcined at 1,040° C. to form a calcined powder. In Table 6, the MnO content as the second secondary constituent and the CuO content as the third secondary constituent were represented by parts by weight to 100 parts by weight of the primary constituent $\{x(Ba_\alpha Ca_\beta Sr_\gamma)O\text{-}y[(TiO_2)_{1-m}(ZrO_2)_m]\text{-}zRe_2O_3\}$ wherein x+y+z=100 on a molar basis, $\alpha+\beta+\gamma=1$, $0\leq\beta+\gamma<0.8$, $0\leq m<0.15$, and Re was at least one rare earth element.

Next, 100 parts by weight of the calcined powder, 1.5 parts by weight of boron oxide ($B_2O_3$) and 8.5 parts by weight of silicon oxide ($SiO_2$) were mixed with a polyvinyl butyral solution to form a slurry. The slurry was spread by a doctor blade method to form green sheets. A monolithic ceramic capacitor was fabricated as in sample No. 41.

The monolithic ceramic capacitors of sample Nos. 41 and 42 in Table 6 were subjected to a moisture resistance test. A DC voltage of 16 V was continuously applied to each capacitor for 250 hours in an atmosphere at 2 atm., 100% R.H. (relative humidity), and 121° C. When the insulation resistance of the capacitor reached $1\times10^6 \Omega$ or less during the test, the sample was judged to have failed. The results are shown in Table 7. In Table 7, the asterisked sample number indicates that the sample is outside of the scope of the present invention.

TABLE 7

| Sample No. | Sintering Temperature (° C.) | Moisture Resistance Test Damaged/Tested (Numbers) |
|---|---|---|
| 41 | 1000 | 0/72 |
| *42 | 1000 | 3/72 |

As shown in sample No. 41 in Table 7, the monolithic ceramic capacitor of the present invention containing the $B_2O_3$—$SiO_2$-based glass is not damaged during the moisture resistance test, and thus shows superior moisture resistance. In contrast, the monolithic ceramic capacitor in sample No. 42, which does not contain the $B_2O_3$—$SiO_2$-based glass component, but does contain boron oxide ($B_2O_3$) and silicon oxide ($SiO_2$), is damaged during the moisture resistance test, and exhibits poor moisture resistance. These results show that the $B_2O_3$—$SiO_2$-based glass contributes to improvement in moisture resistance.

Example 3

Dielectric ceramic compositions in accordance with the second aspect of the present invention and ceramic capacitors formed thereof were prepared as follows.

As starting powdered materials, barium carbonate ($BaCO_3$), calcium carbonate ($CaCO_3$), strontium carbonate ($SrCO_3$), titanium oxide ($TiO_2$), zirconium oxide ($ZrO_2$), rare earth oxides ($Re_2O_3$), manganese carbonate ($MnCO_3$) and copper oxide (CuO) were prepared.

These powdered materials were wet-mixed with ethanol in a ball mill for 16 hours, according to the formulations for the primary constituent, the second secondary constituent and the third secondary constituent shown in Tables 8 and 9 to form slurries, and the slurries were dried. The dried mixtures were pulverized and calcined at 1,040° C. to form calcined powders. Each calcined powder had an average diameter of 0.9 $\mu$m. In Tables 8 and 9, the MnO content as the second secondary constituent and the CuO content as the third secondary constituent were represented by parts by weight to 100 parts by weight of the primary constituent $\{x(Ba_\alpha Ca_\beta Sr_\gamma)O\text{-}y[(TiO_2)_{1-m}(ZrO_2)_m]\text{-}zRe_2O_3\}$ wherein x+y+z=100 on a molar basis, $\alpha+\beta+\gamma=1$, $0\leq\beta+\gamma<0.8$, $0\leq m<0.15$, and Re was at least one rare earth element. In Tables 8 and 9, asterisked sample numbers indicate that the samples are outside of the scope of the present invention, whereas the other samples are within the scope of the present invention.

TABLE 8

| | $x(Ba_\alpha Ca_\beta Sr_\gamma)O\text{-}y[(TiO_2)_{1-m}(ZrO_2)_m]\text{-}zRe_2O_3$ | | | | | | | First Secondary Constituent $SiO_2$ - based Glass (a) | | Second Secondary Constituent |
|---|---|---|---|---|---|---|---|---|---|---|
| Sample No. | x (mol %) | α | β | γ | y (mol %) | m | z (mol %) | Molar Ratio of Rare Earth Elements | Glass Type | MnO (b) Parts by Weight |
| *101 | 6 | 0.9 | 0.05 | 0.05 | 89 | 0.02 | 5 | Nd/Er/Pr = 70/20/10 | A' | 7 | 2 |
| *102 | 9 | 0.9 | 0.05 | 0.05 | 55 | 0.02 | 36 | Nd/Er/Pr = 70/20/10 | A' | 7 | 2 |
| *103 | 10 | 0.9 | 0.05 | 0.05 | 77 | 0.02 | 13 | Nd/Er/Pr = 70/20/10 | A' | 7 | 2 |
| *104 | 10 | 0.9 | 0.05 | 0.05 | 66 | 0.02 | 24 | Nd/Er/Pr = 70/20/10 | A' | 7 | 2 |
| *105 | 6 | 0.9 | 0.05 | 0.05 | 74 | 0.02 | 20 | Nd/Er/Pr = 70/20/10 | A' | 7 | 2 |
| 106 | 9 | 1 | 0 | 0 | 71 | 0.04 | 20 | Nd/Er/La = 85/10/5 | F' | 10 | 2 |
| 107 | 9 | 0.6 | 0.3 | 0.1 | 71 | 0.04 | 20 | Nd/Er/La = 85/10/5 | F' | 10 | 2 |
| 108 | 9 | 0.4 | 0.4 | 0.2 | 71 | 0.04 | 20 | Nd/Er/La = 85/10/5 | F' | 10 | 2 |
| *109 | 9 | 0.2 | 0.5 | 0.3 | 71 | 0.04 | 20 | Nd/Er/La = 85/10/5 | F' | 10 | 2 |
| 110 | 9 | 0.8 | 0.1 | 0.1 | 71 | 0 | 20 | Nd/Er/Dy = 50/30/20 | G' | 10 | 2.5 |
| 111 | 9 | 0.8 | 0.1 | 0.1 | 71 | 0.05 | 20 | Nd/Er/Dy = 50/30/20 | G' | 10 | 2.5 |
| *112 | 9 | 0.8 | 0.1 | 0.1 | 71 | 0.15 | 20 | Nd/Er/Dy = 50/30/20 | G' | 10 | 2.5 |
| *113 | 9 | 0.85 | 0.1 | 0.05 | 85 | 0 | 6 | Nd/Pr/Dy = 80/10/10 | A' | 0 | 0 |
| *114 | 9 | 0.85 | 0.1 | 0.05 | 85 | 0 | 6 | Nd/Pr/Dy = 80/10/10 | A' | 10 | 0 |
| *115 | 9 | 0.85 | 0.1 | 0.05 | 85 | 0 | 6 | Nd/Pr/Dy = 80/10/10 | A' | 0 | 2 |
| *116 | 9 | 0.9 | 0.1 | 0 | 71 | 0.03 | 20 | Sm/Dy/Pr = 60/35/5 | D' | 0 | 3 |
| 117 | 9 | 0.9 | 0.1 | 0 | 71 | 0.03 | 20 | Sm/Dy/Pr = 60/35/5 | D' | 0.1 | 3 |
| 118 | 9 | 0.9 | 0.1 | 0 | 71 | 0.03 | 20 | Sm/Dy/Pr = 60/35/5 | D' | 5 | 3 |
| 119 | 9 | 0.9 | 0.1 | 0 | 71 | 0.03 | 20 | Sm/Dy/Pr = 60/35/5 | D' | 25 | 3 |
| *120 | 9 | 0.9 | 0.1 | 0 | 71 | 0.03 | 20 | Sm/Dy/Pr = 60/35/5 | D' | 30 | 3 |
| 121 | 9 | 0.95 | 0 | 0.05 | 71 | 0 | 20 | Nd = 100 | E' | 5 | 2 |

TABLE 8-continued

| | x(Ba$_\alpha$Ca$_\beta$Sr$_\gamma$)O-y[(TiO$_2$)$_{1-m}$(ZrO$_2$)$_m$]-zRe$_2$O$_3$ | | | | | | First Secondary Constituent SiO$_2$ - based Glass (a) | | Second Secondary Constituent |
|---|---|---|---|---|---|---|---|---|---|
| Sample No. | x (mol %) | α | β | γ | y (mol %) | m | z (mol %) | Molar Ratio of Rare Earth Elements | Glass Type | MnO (b) Parts by Weight |

| Sample No. | x (mol %) | α | β | γ | y (mol %) | m | z (mol %) | Molar Ratio of Rare Earth Elements | Glass Type | Parts by Weight |
|---|---|---|---|---|---|---|---|---|---|---|
| 122 | 9 | 1 | 0 | 0 | 85 | 0 | 6 | Nd/Sm/Ce = 75/20/5 | I' | 10 | 1.6 |
| *123 | 9 | 1 | 0 | 0 | 85 | 0 | 6 | Nd/Sm/Ce = 75/20/5 | C' | 10 | 1.6 |
| 124 | 9 | 1 | 0 | 0 | 85 | 0 | 6 | Nd/Sm/Ce = 75/20/5 | C' | 10 | 1.6 |
| 125 | 9 | 1 | 0 | 0 | 85 | 0 | 6 | Nd/Sm/Ce = 75/20/5 | C' | 10 | 5 |
| 126 | 9 | 1 | 0 | 0 | 85 | 0 | 6 | Nd/Sm/Ce = 75/20/5 | C' | 10 | 20 |
| *127 | 9 | 1 | 0 | 0 | 85 | 0 | 6 | Nd/Sm/Ce = 75/20/5 | C' | 10 | 25 |
| 128 | 9 | 0.85 | 0.1 | 0.05 | 85 | 0 | 6 | Nd/Pr/Dy = 80/10/10 | B' | 10 | 2 |
| 129 | 9 | 0.85 | 0.1 | 0.05 | 85 | 0 | 6 | Nd/Pr/Dy = 80/10/10 | A' | 10 | 2 |

TABLE 9

| | x(Ba$_\alpha$Ca$_\beta$Sr$_\gamma$)O-y[(TiO$_2$)$_{1-m}$(ZrO$_2$)$_m$]-zRe$_2$O$_3$ | | | | | | | First Secondary Constituent SiO$_2$ - based Glass (a) | Second Secondary Constituent MnO (b) | Third Secondary Constituent CuO (c) |
|---|---|---|---|---|---|---|---|---|---|---|
| Sample No. | x (mol %) | α | β | γ | y (mol %) | m | z (mol %) | Molar Ratio of Rare Earth Elements | Glass Type | Parts by Weight | |

| Sample No. | x (mol %) | α | β | γ | y (mol %) | m | z (mol %) | Molar Ratio of Rare Earth Elements | Glass Type | MnO | CuO |
|---|---|---|---|---|---|---|---|---|---|---|---|
| 130 | 7 | 0.9 | 0.05 | 0.05 | 78 | 0 | 15 | Nd/Er/Pr = 70/20/10 | A | 7 | 2 | 2 |
| 131 | 7 | 0.9 | 0.05 | 0.05 | 66 | 0 | 27 | Nd/Er/Pr = 70/20/10 | A | 7 | 2 | 2 |
| 132 | 9 | 0.9 | 0.05 | 0.05 | 85 | 0 | 6 | Nd/Er/Pr = 70/20/10 | A | 7 | 2 | 2 |
| 133 | 9 | 0.9 | 0.05 | 0.05 | 71 | 0 | 20 | Nd/Er/Pr = 70/20/10 | A | 7 | 2 | 2 |
| 134 | 9 | 0.9 | 0.05 | 0.05 | 59 | 0 | 32 | Nd/ER/Pr = 70/20/10 | A | 7 | 2 | 2 |
| 135 | 9 | 0.95 | 0 | 0.05 | 71 | 0 | 20 | Nd = 100 | E | 5 | 2 | 1 |
| 136 | 9 | 0.95 | 0 | 0.05 | 71 | 0 | 20 | Nd = 100 | E | 5 | 2 | 10 |
| *137 | 9 | 0.95 | 0 | 0.05 | 71 | 0 | 20 | Nd = 100 | E | 5 | 2 | 15 |

Moreover, SiO$_2$-based glass powders and B$_2$O$_3$—SiO$_2$-based glass powders composed of glass types A to G and I were prepared as first secondary constituents according to the formulations shown in Table 10 in which the coefficient of each oxide was represented by percent by weight.

TABLE 10

| Glass Type | Composition (Percent by weight) |
|---|---|
| A' | 35B$_2$O$_3$-45SiO$_2$-18BaO-2Al$_2$O$_3$ |
| B' | 53SiO$_2$-32Li$_2$O-13BaO-2Al$_2$O$_3$ |
| C' | 28B$_2$O$_3$-37SiO$_2$-35BaO |
| D' | 19B$_2$O$_3$-16SiO$_2$-58BaO-4Li$_2$O-3Al$_2$O$_3$ |
| E' | 20B$_2$O$_3$-17SiO$_2$-45BaO-9CaO-9SrO |
| F' | 36B$_2$O$_3$-34SiO$_2$-30ZnO |
| G' | 20B$_2$O$_3$-18SiO$_2$-61BaO-1Li$_2$O |
| H' | 20B$_2$O$_3$-80SiO$_2$ |
| I' | 60SiO$_2$-20Li$_2$O-15CaO-5Al$_2$O$_3$ |

The calcined powders and glass powders were mixed with a polyvinyl butyral solution to form slurries, according to the formulations shown in Tables 8 and 9. Each slurry was spread by a doctor blade method to form green sheets, each having a thickness of 50 μm. The glass content is represented by parts by weight to 100 parts by weight of the primary constituent.

Next, 13 green sheets were laminated, were pressed, and were cut by punching into a green composite having a diameter of 14 mm and a thickness of 0.5 mm. The green composite was heated at 350° C. in a nitrogen atmosphere to remove the binder, and was sintered at a sintering temperature shown in either Table 11 or 12 for 2 hours in a hydrogen-nitrogen-hydrogen oxide-based reducing atmosphere to form a disk-like ceramic composite. In-Ga electrodes were formed by coating on both main surfaces of the resulting ceramic composite to form a single-layered ceramic capacitor.

TABLE 11

| Sample No. | Sintering Temperature (° C.) | Specific Dielectric Constant 1 MHz | Q 1 MHz | TCC (ppm/° C.) |
|---|---|---|---|---|
| *101 | 1050 | 38 | 500 | −124 |
| *102 | 1060 | | Not Sintered | |
| *103 | 1050 | 62 | 1600 | −82 |
| *104 | 1050 | 61 | 2200 | −64 |
| *105 | 1050 | 47 | 4600 | −28 |
| 106 | 1040 | 52 | 2700 | −39 |
| 107 | 1050 | 54 | 2800 | −46 |
| 108 | 1060 | 56 | 2800 | −48 |
| *109 | 1060 | | Not Sintered | |
| 110 | 1030 | 52 | 2300 | −40 |
| 111 | 1050 | 51 | 2600 | −39 |
| *112 | 1060 | | Not Sintered | |
| *113 | 1060 | | Not Sintered | |
| *114 | 1060 | | Not Sintered | |
| *115 | 1060 | | Not Sintered | |
| *116 | 1060 | | Not Sintered | |
| 117 | 1060 | 50 | 2500 | −45 |
| 118 | 1040 | 53 | 2800 | −41 |
| 119 | 1000 | 51 | 2600 | −37 |
| *120 | 980 | 52 | 500 | −35 |
| 121 | 1060 | 53 | 2100 | −38 |
| 122 | 1040 | 51 | 2100 | −57 |
| *123 | 1030 | 53 | 2200 | −64 |
| 124 | 1030 | 53 | 2400 | −58 |
| 125 | 990 | 52 | 2300 | −43 |
| 126 | 960 | 52 | 2200 | −32 |
| *127 | 950 | 50 | 800 | 15 |

TABLE 11-continued

| Sample No. | Sintering Temperature (° C.) | Specific Dielectric Constant 1 MHz | Q 1 MHz | TCC (ppm/° C.) |
| --- | --- | --- | --- | --- |
| 128 | 1060 | 52 | 2300 | −57 |
| 129 | 1030 | 52 | 2300 | −57 |

TABLE 12

| Sample No. | Sintering Temperature (° C.) | Specific Dielectric Constant 1 MHz | Q 1 MHz | TCC (ppm/° C.) |
| --- | --- | --- | --- | --- |
| 130 | 1030 | 53 | 2000 | −40 |
| 131 | 1030 | 52 | 2000 | −45 |
| 132 | 1030 | 52 | 2600 | −58 |
| 133 | 1030 | 55 | 2700 | −38 |
| 134 | 1030 | 51 | 2000 | −59 |
| 135 | 1000 | 54 | 2600 | −36 |
| 136 | 950 | 55 | 2400 | −31 |
| *137 | 950 | 55 | 700 | −27 |

Electrical characteristics of each ceramic capacitor were measured. The electrostatic capacitance and the Q value were measured at 20° C., a frequency of 1 MHZ and a voltage of 1 Vrms. The specific dielectric constant ($\in$r) was calculated from the diameter (D) and the thickness (T) of the sample and the electrostatic capacitance. The TCC was calculated using the equation (1):

$$TCC = \{(Cap85 - Cap20)/[Cap20 \times (85 - 20)]\} \times 10^6 \; [ppm/°C.] \quad (1)$$

wherein Cap20 indicated the electrostatic capacitance [pF] at 20° C. and Cap85 indicated the electrostatic capacitance [pF] at 85° C.

The results are shown in Tables 11 and 12. In Tables 11 and 12, asterisked sample numbers indicate that the samples are outside of the scope of the present invention, whereas the other samples are within the scope of the present invention.

As shown in Tables 8 and 11, the ceramic capacitors in accordance with the second aspect of the present invention have the compositions represented by sample Nos. 106 to 108, 110, 111, 117 to 119, 121, 122, 124 to 126, 128 and 129, each composed of the primary constituent, the $SiO_2$-based glass not containing lead oxide as the first secondary constituent, and manganese oxide as the second secondary constituent. Each dielectric ceramic capacitor has a specific dielectric constant of as high as 50 or more, a Q value of as high as 1,000 or more at 1 MHZ, and a TCC of as small as within ±60 ppm/° C. Moreover, the dielectric ceramic composition can be sintered at 1,060° C. or less which is lower than the melting point (1,083° C.) of copper.

As shown in sample Nos. 122, 124, 128 and 129, when the first secondary constituent is a $B_2O_3$—$SiO_2$-based glass not containing lead oxide, sintering of the dielectric ceramic at a low temperature is facilitated.

As shown in sample Nos. 135 and 136 in Tables 9 and 12, when CuO as the third secondary constituent is present, sintering of the dielectric ceramic at a low temperature is further facilitated. Since none of the compositions contain volatile lead oxide, the ceramic composition can be sintered without fluctuation of various characteristics.

Reasons for limitation of the composition in the second aspect of the present invention will now be described.

Figure 2:
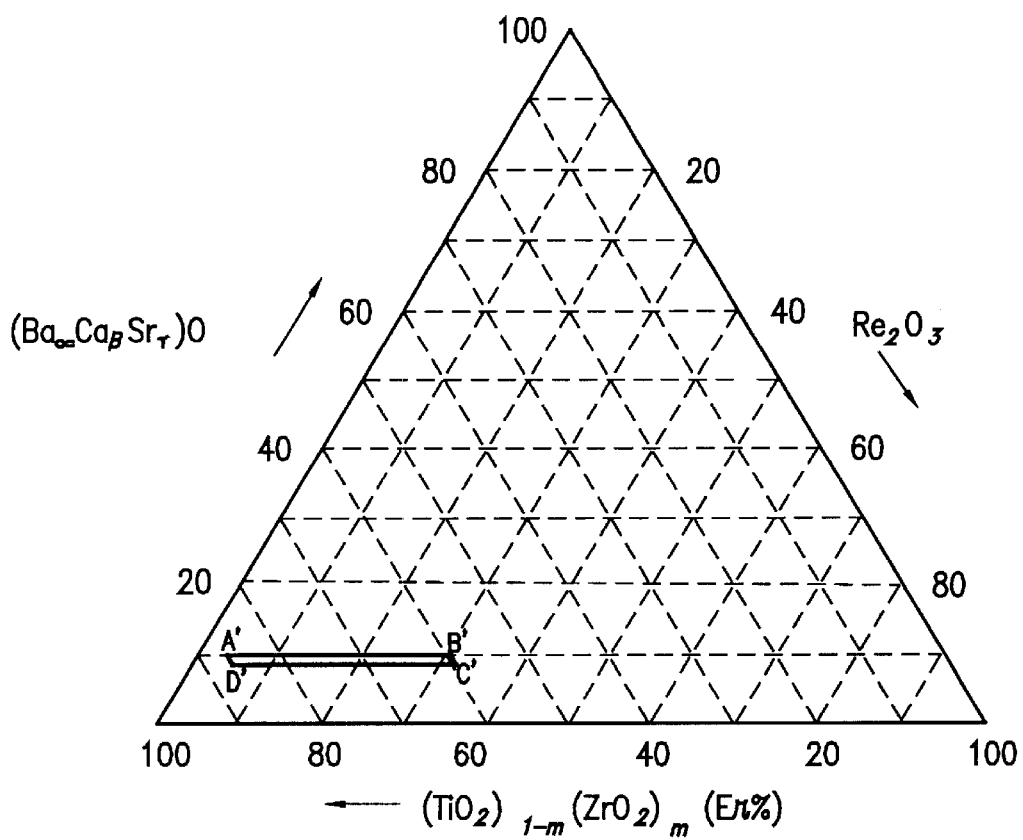
FIG. 2 is a ternary diagram showing the range of the preferable mole fraction of $(Ba_\alpha Ca_\beta Sr_\gamma)O$, $(TiO_2)_{1-m}$ $(ZrO_2)_m$, and $Re_2O_3$ in a primary constituent in a dielectric ceramic composition in accordance with a second aspect of the present invention.

As in sample Nos. 101 to 104 shown in Tables 8 and 11, when the mole fraction (x, y, z) of $(Ba_\alpha Ca_\beta Sr_\gamma)O$, $(TiO_2)_{1-m}$ $(ZrO_2)_m$, and $Re_2O_3$ in the primary constituent, which is represented by the formula $x(Ba_\alpha Ca_\beta Sr_\gamma)O$-$y[(TiO_2)_{1-m}(ZrO_2)_m]$-$zRe_2O_3$ wherein x+y+z=100 on a molar basis, α+β+γ=1, 0≦β+γ<0.8, 0≦m<0.15, and Re is at least one rare earth element, does not lie within a range surrounded by point A' (10, 85, 5), point B' (10, 59, 31), point C' (7, 59, 34) and point D' (7, 85, 8) in a ternary diagram shown in FIG. 2, the TCC is outside of the range of ±60 ppm/° C., the ceramic composition cannot be sintered at 1,060° C. which is lower than the melting point 1,083° C. of copper, or the Q value is less than 1,000. Thus, the mole fraction (x, y, z) in the primary constituent preferably lies within the range surrounded by point A' (10, 85, 5), point B' (10, 59, 31), point C' (7, 59, 34) and point D' (7, 85, 8) in the ternary diagram shown in FIG. 2 wherein the line AB is not included. When the total mole fraction x of Ba, Ca, and Sr is less than 7, the dielectric constant is 50 or less. When the total mole fraction x is 10 or more, the TCC is outside of the range of ±60 ppm/° C. Thus, the preferable range of x is 7≦x<10. When the total mole fraction y of Ti and Zr is less than 59, the composition cannot be sintered at a temperature which is less than the melting point 1,083° C. of copper. When the total mole fraction y exceeds 85, the Q value is less than 1,000. Thus, the preferable range of y is 59≦y<85.

When Ba is partly replaced with Ca and Sr as shown in sample Nos. 106 to 108, the dielectric constant increases. When the total fraction (β+γ) of Ca and Sr, however, is 0.8 or more as shown in sample No. 109, the composition cannot be sintered at 1,060° C. Thus, the preferable total fraction is in a range of 0≦β+γ<0.8.

When $TiO_2$ is partly replaced with $ZrO_2$, reduction of the oxides in the primary constituent is prevented. Thus, the ceramic composition and a copper conductor can be simultaneously sintered in a reducing atmosphere. When the $ZrO_2$ fraction m exceeds 0.15 as shown in sample No. 112, the composition cannot be sintered at 1,060° C. Thus, the preferable $ZrO_2$ fraction is in a range of 0≦m<0.15.

When the composition contains lead-free glass as the first secondary constituent as shown in sample Nos. 117 to 119, sinterability is improved. When the glass content a is less than 0.1 parts by weight as shown in sample No. 116, the composition cannot be sintered at 1,060° C. When the glass content a exceeds 25 as shown in sample No. 120, the Q value is less than 1,000. Thus, the preferable glass content a is in a range of 0.1≦a<25.

When the composition contains MnO as the second secondary constituent as shown in sample Nos. 124 to 126, sinterability is improved and the TCC is reduced and is shifted to the positive side. When the MnO content b is 1.5 parts by weight or less as shown in sample No. 123, the TCC is outside of the range of ±60 ppm/° C. When the Mn content b exceeds 20 parts by weight as shown in sample No. 127, the Q value is less than 1,000. Thus, the preferable Mn content b is in a range of 1.5<b≦20.

Copper oxide (CuO) as the third secondary constituent contributes to improvement in sinterability. When the CuO content c exceeds 10 parts by weight as shown in sample No. 137 in Tables 9 and 12, the Q value is less than 1,000. Thus, the preferable CuO content c is in a range of c≦10.

Example 4

A monolithic ceramic capacitor in accordance with the second aspect of the present invention was prepared as follows.

As starting powdered materials, barium carbonate ($BaCO_3$), calcium carbonate ($CaCO_3$), strontium carbonate ($SrCO_3$), titanium oxide ($TiO_2$), zirconium oxide ($ZrO_2$), rare earth oxides ($Re_2O_3$), manganese carbonate ($MnCO_3$), and copper oxide (CuO) were prepared.

These powdered materials were wet-mixed with ethanol in a ball mill for 16 hours, according to the formulation for the primary constituent, the second secondary constituent and the third secondary constituent shown in sample No. 141 in Table 13 to form slurry, and the slurry was dried. The dried mixture was calcined at 1,040° C. to form a calcined powder. In Table 13, the MnO content as the second secondary constituent and the CuO content as the third secondary constituent were represented by parts by weight to 100 parts by weight of the primary constituent $\{x(Ba_\alpha Ca_\beta Sr_\gamma)O\text{-}y[(TiO_2)_{1-m}(ZrO_2)_m]\text{-}zRe_2O_3\}$ wherein x+y+z=100 on a molar basis, $\alpha+\beta+\gamma=1$, $0\leq\beta+\gamma<0.8$, $0\leq m<0.15$, and Re was at least one rare earth element. In Table 13, the asterisked sample number indicates that the sample is outside of the scope of the present invention.

the primary constituent, the second secondary constituent, and the third secondary constituent shown in sample No. 142 in Table 13 to form slurry, and the slurry was dried. The dried mixture was calcined at 1,040° C. to form a calcined powder. In Table 13, the MnO content as the second secondary constituent and the CuO content as the third secondary constituent were represented by parts by weight to 100 parts by weight of the primary constituent $\{x(Ba_\alpha Ca_\beta Sr_\gamma)O\text{-}y[(TiO_2)_{1-m}(ZrO_2)_m]\text{-}zRe_2O_3\}$ wherein x+y+z=100 on a molar basis, $\alpha+\beta+\gamma=1$, $0\leq\beta+\gamma<0.8$, $0\leq m<0.15$, and Re was at least one rare earth element.

Next, 100 parts by weight of the calcined powder, 2 parts by weight of boron oxide ($B_2O_3$), and 8 parts by weight of silicon oxide ($SiO_2$) were mixed with a polyvinyl butyral solution to form a slurry. The slurry was spread by a doctor blade method to form green sheets. A monolithic ceramic capacitor was fabricated as in sample No. 141.

TABLE 13

| | $x(Ba_\alpha Ca_\beta Sr_\gamma)O\text{-}y[(TiO_2)_{1-m}(ZrO_2)_m]\text{-}zRe_2O_3$ | | | | | | | First Secondary Constituent | | Second Secondary Constituent | Third Secondary Constituent | | |
|---|---|---|---|---|---|---|---|---|---|---|---|---|---|
| Sample | x | | | | y | | | Molar Ratio of Rare | $SiO_2$ - based Glass | | MnO (b) | CuO (c) | $B_2O_3$ | $SiO_3$ |
| No. | (mol %) | α | β | γ | (mol %) | m | z | Earth Elements | Glass Type | | | Parts by Weight | | |
| 41 | 9 | 0.8 | 0.1 | 0.1 | 71 | 0.1 | 20 | Nd/Er = 60/40 | H | 10 | 2 | 1 | 0 | 0 |
| *42 | 9 | 0.8 | 0.1 | 0.1 | 71 | 0.1 | 20 | Nd/Er = 60/40 | — | 0 | 2 | 1 | 2 | 8 |

Moreover, a glass powder of glass type H ($20B_2O_3$—$80SiO_2$) was prepared as the first secondary constituent according to the formulation shown in Table 10 in which the coefficient of each oxide was represented by percent by weight.

Next, 100 parts by weight of the calcined powder and 10 parts by weight of the glass powder were mixed with a polyvinyl butyral solution to form a slurry. The slurry was spread by a doctor blade method to form green sheets.

A conductive paste layer was formed on each green sheet by printing a conductive paste primarily composed of copper to form an internal electrode. A plurality of the green sheets provided with the internal electrodes were laminated so that the conductive paste layers were alternately exposed at both side faces of the laminate, and a conductive paste primarily composed of copper was applied to both side faces of the laminate to form a green composite. The green composite was heated at 350° C. in a nitrogen atmosphere to remove the binder, and was sintered at 1,000° C. for 2 hours in a hydrogen-nitrogen-hydrogen oxide-based reducing atmosphere to form a monolithic ceramic capacitor.

The resulting monolithic ceramic capacitor had a width of 1.6 mm, a length of 3.2 mm and a thickness of 1.2 mm. The thickness of the dielectric ceramic layer among the internal electrodes was 6 μm. The number of the effective dielectric ceramic layers was 150.

As a comparative example, a monolithic ceramic capacitor using a dielectric composition shown in sample No. 142 in Table 13 was prepared as follows.

As starting powdered materials, barium carbonate ($BaCO_3$), calcium carbonate ($CaCO_3$), strontium carbonate ($SrCO_3$), titanium oxide ($TiO_2$), zirconium oxide ($ZrO_2$), rare earth oxides ($Re_2O_3$), manganese carbonate ($MnCO_3$), copper oxide (CuO), boron oxide ($B_2O_3$) and silicon oxide ($SiO_2$) were prepared.

These powdered materials were wet-mixed with ethanol in a ball mill for 16 hours, according to the formulation for The monolithic ceramic capacitors of sample Nos. 141 and 142 in Table 13 were subjected to a moisture resistance test. A DC voltage of 16 V was continuously applied to each capacitor for 250 hours in an atmosphere at 2 atm., 100% R.H. (relative humidity), and 121° C. When the insulation resistance of the capacitor reached $1\times10^6\Omega$ or less during the test, the sample was judged to have failed. The results are shown in Table 14. In Table 14, the asterisked sample number indicates that the sample is outside of the scope of the present invention.

TABLE 14

| Sample No. | Sintering Temperature (° C.) | Moisture Resistance Test Damaged/Tested (Numbers) |
|---|---|---|
| 141 | 1000 | 0/72 |
| *142 | 1000 | 4/72 |

As shown in sample No. 141 in Table 14, the monolithic ceramic capacitor of the present invention containing the $B_2O_3$—$SiO_2$-based glass is not damaged during the moisture resistance test, and thus shows superior moisture resistance. In contrast, the monolithic ceramic capacitor in sample No. 142, which does not contain the $B_2O_3$—$SiO_2$-based glass component, but does contain boron oxide ($B_2O_3$) and silicon oxide ($SiO_2$), is damaged during the moisture resistance test, and exhibits poor moisture resistance. These results show that the $B_2O_3$—$SiO_2$-based glass contributes to improvement in moisture resistance.

Example 5

Dielectric ceramic compositions in accordance with the third aspect of the present invention and ceramic capacitors formed thereof were prepared as follows.

As starting powdered materials, barium carbonate ($BaCO_3$), calcium carbonate ($CaCO_3$), strontium carbonate (SrCO$_3$), titanium oxide (TiO$_2$), zirconium oxide (ZrO$_2$), rare earth oxides (Re$_2$O$_3$), manganese carbonate (MnCO$_3$) and copper oxide (CuO) were prepared.

These powdered materials were wet-mixed with ethanol in a ball mill for 16 hours, according to the formulations for the primary constituent, the second secondary constituent and the third secondary constituent shown in Tables 15 and 16 to form slurries, and the slurries were dried. The dried mixtures were pulverized and calcined at 1,040° C. to form calcined powders. Each calcined powder had an average diameter of 0.9 μm. In Tables 15 and 16, the MnO content as the second secondary constituent and the CuO content as the third secondary constituent were represented by parts by weight to 100 parts by weight of the primary constituent $\{x(Ba_\alpha Ca_\beta Sr_\gamma)O-y[(TiO_2)_{1-m}(ZrO_2)_m]-zRe_2O_3\}$ wherein x+y+z=100 on a molar basis, α+β+γ=1, 0≦β+γ<0.8, 0≦m<0.15, and Re was at least one rare earth element. In Tables 15 and 16, asterisked sample numbers indicate that the samples are outside of the scope of the present invention, whereas the other samples are within the scope of the present invention.

TABLE 15

| | x(Ba$_\alpha$Ca$_\beta$Sr$_\gamma$)O-y[(TiO$_2$)$_{1-m}$(ZrO$_2$)$_m$]-zRe$_2$O$_3$ | | | | | | | First Secondary Constituent SiO$_2$ - based Glass (a) | | Second Secondary Constituent |
|---|---|---|---|---|---|---|---|---|---|---|
| Sample No. | x (mol %) | α | β | γ | y (mol %) | m | z (mol %) | Molar Ratio of Rare Earth Elements | Glass Type | MnO (b) Parts by Weight |
| *201 | 25 | 0.8 | 0.15 | 0.05 | 72 | 0.02 | 3 | Nd/La = 95/5 | A" | 0 | 0 |
| *202 | 25 | 0.8 | 0.15 | 0.05 | 72 | 0.02 | 3 | Nd/La = 95/5 | A" | 10 | 0 |
| *203 | 25 | 0.8 | 0.15 | 0.05 | 72 | 0.02 | 3 | Nd/La = 95/5 | A" | 0 | 3 |
| 204 | 25 | 0.8 | 0.15 | 0.05 | 72 | 0.02 | 3 | Nd/La-95/5 | A" | 10 | 3.5 |
| 205 | 25 | 0.8 | 0.15 | 0.05 | 72 | 0.02 | 3 | Nd/La-95/5 | B" | 10 | 3.5 |
| *206 | 25 | 1 | 0 | 0 | 72 | 0.01 | 3 | Nd/Sm = 65/35 | C" | 10 | 3 |
| 207 | 25 | 1 | 0 | 0 | 72 | 0.01 | 3 | Nd/Sm = 65/35 | C" | 10 | 4 |
| 208 | 25 | 1 | 0 | 0 | 72 | 0.01 | 3 | Nd/Sm = 65/35 | C" | 10 | 10 |
| 209 | 25 | 1 | 0 | 0 | 72 | 0.01 | 3 | Nd/Sm = 65/35 | C" | 10 | 20 |
| *210 | 25 | 1 | 0 | 0 | 72 | 0.01 | 3 | Nd/Sm = 65/35 | C" | 10 | 25 |
| 211 | 13 | 0.8 | 0.1 | 0.1 | 72 | 0.01 | 15 | Nd = 100 | E" | 5 | 3.5 |
| *212 | 9 | 0.95 | 0 | 0.05 | 71 | 0.01 | 20 | Nd/Er = 85/15 | C" | 6 | 4 |
| *213 | 10 | 0.95 | 0 | 0.05 | 89 | 0.01 | 1 | Nd/Er = 85/15 | C" | 6 | 4 |
| *214 | 15 | 0.95 | 0 | 0.05 | 55 | 0.01 | 30 | Nd/Er = 85/15 | C" | 6 | 4 |
| *215 | 32 | 0.95 | 0 | 0.05 | 55 | 0.01 | 13 | Nd/Er = 85/15 | C" | 6 | 4 |
| *216 | 13 | 1 | 0 | 0 | 72 | 0 | 15 | Sm/Er/Dy = 70/25/5 | E" | 0 | 5 |
| 217 | 13 | 1 | 0 | 0 | 72 | 0 | 15 | Sm/Er/Dy = 70/25/5 | E" | 0.1 | 5 |
| 218 | 13 | 1 | 0 | 0 | 72 | 0 | 15 | Sm/Er/Dy = 70/25/5 | E" | 5 | 5 |
| 219 | 13 | 1 | 0 | 0 | 72 | 0 | 15 | Sm/Er/Dy = 70/25/5 | E" | 25 | 5 |
| *220 | 13 | 1 | 0 | 0 | 72 | 0 | 15 | Sm/Er/Dy = 70/25/5 | E" | 30 | 5 |
| 221 | 20 | 1 | 0 | 0 | 72 | 0 | 8 | Nd/Er/Sm = 70/20/10 | G" | 3 | 4 |
| 222 | 20 | 0.6 | 0.2 | 0.2 | 72 | 0 | 8 | Nd/Er/Sm = 70/20/10 | G" | 3 | 4 |
| 223 | 20 | 0.4 | 0.3 | 0.3 | 72 | 0 | 8 | Nd/Er/Sm = 70/20/10 | G" | 3 | 4 |
| *224 | 20 | 0.2 | 0.4 | 0.4 | 72 | 0 | 8 | Nd/Er/Sm = 70/20/10 | G" | 3 | 4 |
| 225 | 20 | 0.9 | 0.05 | 0.05 | 72 | 0 | 8 | Nd/Sm/Dy = 70/25/5 | E" | 4 | 4 |
| 226 | 20 | 0.9 | 0.05 | 0.05 | 72 | 0.05 | 8 | Nd/Sm/Dy = 70/25/5 | E" | 4 | 4 |
| 227 | 20 | 0.9 | 0.05 | 0.05 | 72 | 0.10 | 8 | Nd/Sm/Dy = 70/25/5 | E" | 4 | 4 |
| *228 | 20 | 0.9 | 0.05 | 0.05 | 72 | 0.15 | 8 | Nd/Sm/Dy = 70/25/5 | E" | 4 | 4 |

TABLE 16

| | x(Ba$_\alpha$Ca$_\beta$Sr$_\gamma$)O-y[(TiO$_2$)$_{1-m}$(ZrO$_2$)$_m$]-zRe$_2$O$_3$ | | | | | | | First Secondary Constituent | Second Secondary Constituent | Third Secondary Constituent |
|---|---|---|---|---|---|---|---|---|---|---|
| Sample No. | x (mol %) | α | β | γ | y (mol %) | m | z (mol %) | Molar Ratio of Rare Earth Elements | SiO$_2$ - based Glass (a) Glass Type | MnO (b) Parts by Weight | CuO (c) |
| *229 | 9 | 0.95 | 0 | 0.05 | 71 | 0.1 | 20 | Nd/Er = 85/15 | A" | 6 | 4 | 1 |
| 230 | 10 | 0.95 | 0 | 0.05 | 77 | 0.1 | 13 | Nd/Er = 85/15 | A" | 6 | 4 | 1 |
| 231 | 10 | 0.95 | 0 | 0.05 | 66 | 0.1 | 24 | Nd/Er = 85/15 | A" | 6 | 4 | 1 |
| *232 | 10 | 0.95 | 0 | 0.05 | 89 | 0.1 | 1 | Nd/Er = 85/15 | A" | 6 | 4 | 1 |
| 233 | 12 | 0.95 | 0 | 0.05 | 85 | 0.1 | 3 | Nd/Er = 85/15 | A" | 6 | 4 | 1 |
| 234 | 13 | 0.95 | 0 | 0.05 | 72 | 0.1 | 15 | Nd/Er = 85/15 | A" | 6 | 4 | 1 |
| *235 | 15 | 0.95 | 0 | 0.05 | 55 | 0.1 | 30 | Nd/Er = 85/15 | A" | 6 | 4 | 1 |
| 236 | 25 | 0.95 | 0 | 0.05 | 72 | 0.1 | 3 | Nd/Er = 85/15 | A" | 6 | 4 | 1 |
| 237 | 18 | 0.95 | 0 | 0.05 | 59 | 0.1 | 23 | Nd/Er = 85/15 | A" | 6 | 4 | 1 |
| 238 | 30 | 0.95 | 0 | 0.05 | 67 | 0.1 | 3 | Nd/Er = 85/15 | A" | 6 | 4 | 1 |
| 239 | 25 | 0.95 | 0 | 0.05 | 62 | 0.01 | 13 | Nd/Er = 85/15 | A" | 6 | 4 | 1 |
| 240 | 20 | 0.95 | 0 | 0.05 | 62 | 0.01 | 18 | Nd/Er = 85/15 | A" | 6 | 4 | 1 |
| 241 | 20 | 0.95 | 0 | 0.05 | 72 | 0.01 | 8 | Nd/Er = 85/15 | A" | 6 | 4 | 1 |
| *242 | 32 | 0.95 | 0 | 0.05 | 55 | 0.01 | 13 | Nd/Er = 85/15 | A" | 6 | 4 | 1 |
| *243 | 38 | 0.95 | 0 | 0.05 | 59 | 0.01 | 3 | Nd/Er = 85/15 | A" | 6 | 4 | 1 |
| 244 | 13 | 1 | 0 | 0 | 72 | 0 | 15 | Sm/Dy/Er = 60/20/20 | D" | 5 | 5 | 1 |

TABLE 16-continued

| | x(Ba$_\alpha$Ca$_\beta$Sr$_\gamma$)O-y[(TiO$_2$)$_{1-m}$(ZrO$_2$)$_m$]-zRe$_2$O$_3$ | | | | | | First Secondary Constituent SiO$_2$ - based Glass (a) | Second Secondary Constituent MnO (b) | Third Secondary Constituent CuO (c) |
|---|---|---|---|---|---|---|---|---|---|
| Sample No. | x (mol %) | α | β | γ | y (mol %) | m | z (mol %) | Molar Ratio of Rare Earth Elements | Glass Type | Parts by Weight | |
| 245 | 13 | 1 | 0 | 0 | 72 | 0 | 15 | Sm/Dy/Er = 60/20/20 | D" | 25 | 5 | 1 |
| 246 | 20 | 0.6 | 0.2 | 0.2 | 72 | 0 | 8 | Nd/Sm/Dy/Er = 60/20/20 | F" | 3 | 4 | 0.5 |
| 247 | 20 | 0.4 | 0.3 | 0.3 | 72 | 0 | 8 | Nd/Sm/Dy/Er = 60/20/20 | F" | 3 | 4 | 0.5 |
| 248 | 19 | 0.8 | 0.1 | 0.1 | 72 | 0.01 | 15 | Nd = 100 | E" | 5 | 3.5 | 1 |
| 249 | 13 | 0.8 | 0.1 | 0.1 | 72 | 0.01 | 15 | Nd = 100 | E" | 5 | 3.5 | 10 |
| *250 | 13 | 0.8 | 0.1 | 0.1 | 72 | 0.01 | 15 | Nd = 100 | E" | 5 | 3.5 | 15 |

Moreover, SiO$_2$-based glass powders and B$_2$O$_3$—SiO$_2$-based glass powders composed of glass types A to G were prepared as first secondary constituents according to the formulations shown in Table 17 in which the coefficient of each oxide was represented by percent by weight.

TABLE 17

| Glass Type | Composition (percent by weight) |
|---|---|
| A" | 28B$_2$O$_3$-42SiO$_2$-10ZnO-17BaO-3Al$_2$O$_3$ |
| B" | 45SiO$_2$-27Li$_2$O-15BaO-10ZnO-3Al$_2$O$_3$ |
| C" | 20B$_2$O$_3$-30SiO$_2$-30BaO-30ZnO |
| D" | 15B$_2$O$_3$-15SiO$_2$-55BaO-5Li$_2$O-5Al$_2$O$_3$-5ZnO |
| E" | 18B$_2$O$_3$-17SiO$_2$-40BaO-10CaO-10SrO-5ZnO |
| F" | 35B$_2$O$_3$-30SiO$_2$-35ZnO |
| G" | 18B$_2$O$_3$-19SiO$_2$-40BaO-20ZnO-3Li$_2$O |
| H" | 50SiO$_2$-30Li$_2$O-20ZnO |
| I" | 60SiO$_2$-25Li$_2$O-15BaO |

The calcined powders and glass powders were mixed with a polyvinyl butyral solution to form slurries, according to the formulations shown in Tables 15 and 16. Each slurry was spread by a doctor blade method to form green sheets, each having a thickness of 50 μm. The glass content is represented by parts by weight to 100 parts by weight of the primary constituent.

Next, 13 green sheets were laminated, were pressed, and were cut by punching into a green composite having a diameter of 14 mm and a thickness of 0.5 mm. The green composite was heated at 350° C. in a nitrogen atmosphere to remove the binder, and was sintered at a sintering temperature shown in either Table 18 or 19 for 2 hours in a hydrogen-nitrogen-hydrogen oxide-based reducing atmosphere to from a disk-like ceramic composite. In—Ga electrodes were formed by coating on both main surfaces of the resulting ceramic composite to form a single-layered ceramic capacitor.

TABLE 18

| Sample No. | Sintering Temperature (° C.) | Specific Dielectric Constant 1 MHz | Q 1 MHz | TCC (ppm/° C.) |
|---|---|---|---|---|
| *201 | 1060 | | Not Sintered | |
| *202 | 1060 | | Not Sintered | |
| *203 | 1060 | | Not Sintered | |
| 204 | 1000 | 65 | 1800 | −103 |
| 205 | 1030 | 64 | 1700 | −108 |
| *206 | 1040 | 64 | 1600 | −128 |
| 207 | 1030 | 64 | 1700 | −96 |
| 208 | 980 | 65 | 1500 | −78 |
| 209 | 950 | 66 | 1200 | −61 |
| *210 | 940 | 65 | 800 | −49 |
| 211 | 1030 | 65 | 1800 | −64 |
| *212 | 1040 | 53 | 2400 | −36 |
| *213 | 1040 | 37 | 600 | −147 |
| *214 | 1040 | | Not Sintered | |
| *215 | 1040 | 43 | 1100 | −132 |
| *216 | 1060 | | Not Sintered | |
| 217 | 1060 | 65 | 1800 | −64 |
| 218 | 1000 | 62 | 2600 | −63 |
| 219 | 950 | 61 | 1200 | −76 |
| *220 | 950 | 60 | 700 | −86 |
| 221 | 1040 | 63 | 1800 | −92 |
| 222 | 1050 | 67 | 1400 | −107 |
| 223 | 1060 | 70 | 1500 | −118 |
| *224 | 1060 | | Not Sintered | |
| 225 | 1030 | 65 | 1700 | −96 |
| 226 | 1040 | 64 | 2200 | −98 |
| 227 | 1060 | 66 | 2600 | −103 |
| *228 | 1060 | | Not Sintered | |

TABLE 19

| Sample No. | Sintering Temperature (° C.) | Specific Dielectric Constant 1 MHz | Q 1 MHz | TCC (ppm/° C.) |
|---|---|---|---|---|
| *229 | 1030 | 55 | 3000 | −38 |
| 230 | 1030 | 64 | 1500 | −80 |
| 231 | 1030 | 62 | 1900 | −68 |
| *232 | 1030 | 38 | 500 | −150 |
| 233 | 1030 | 62 | 1300 | −70 |
| 234 | 1030 | 66 | 2000 | −62 |
| *235 | 1030 | | Not Sintered | |
| 236 | 1030 | 64 | 1500 | −95 |
| 237 | 1030 | 63 | 1300 | −105 |
| 238 | 1030 | 62 | 1200 | −115 |
| 239 | 1030 | 63 | 1400 | −87 |
| 240 | 1030 | 62 | 1800 | −83 |
| 241 | 1030 | 64 | 1600 | −91 |
| *242 | 1030 | 45 | 1300 | −138 |
| *243 | 1030 | | Not Sintered | |
| 244 | 980 | 64 | 2500 | −62 |
| 245 | 930 | 63 | 1500 | −73 |
| 246 | 1040 | 66 | 1500 | −105 |
| 247 | 1050 | 72 | 1500 | −115 |
| 248 | 1000 | 64 | 2200 | −69 |
| 249 | 940 | 63 | 2000 | −71 |
| *250 | 930 | 60 | 700 | −73 |

Electrical characteristics of each ceramic capacitor were measured. The electrostatic capacitance and the Q value were measured at 20° C., a frequency of 1 MHZ and a voltage of 1 Vrms. The specific dielectric constant (∈r) was calculated from the diameter (D) and the thickness (T) of the sample and the electrostatic capacitance. The TCC was calculated using the equation (1):

$$TCC=\{(Cap85-Cap20)/[Cap20\times(85-20)]\}\times10^6 \text{ [ppm/° C.]} \quad (1)$$

wherein Cap20 indicated the electrostatic capacitance [pF] at 20° C. and Cap85 indicated the electrostatic capacitance [pF] at 85° C.

The results are shown in Tables 18 and 19. In Tables 18 and 19, asterisked sample numbers indicate that the samples are outside of the scope of the present invention, whereas the other samples are within the scope of the present invention.

As shown in Tables 15 and 18, the ceramic capacitors in accordance with the third aspect of the present invention have the compositions represented by sample Nos. 204, 205, 207 to 209, 211, 217 to 219, 221 to 223, and 225 to 227, each composed of the primary constituent, the $SiO_2$-based glass not containing lead oxide as the first secondary constituent, and manganese oxide as the second secondary constituent. Each dielectric ceramic capacitor has a specific dielectric constant of as high as 60 or more, a Q value of as high as 1,000 or more at 1 MHZ, and a TCC of as small as within ±120 ppm/° C. Moreover, the dielectric ceramic composition can be sintered at 1,060° C. or less which is lower than the melting point (1,083° C.) of copper.

As shown in comparison between sample Nos. 204 and 205, when the first secondary constituent is a $B_2O_3$—$SiO_2$-based glass not containing lead oxide, sintering of the dielectric ceramic at a low temperature is facilitated.

As shown in sample Nos. 248 and 249 in Tables 16 and 19, when CuO as the third secondary constituent is present, sintering of the dielectric ceramic at a low temperature is further facilitated. Since none of the compositions contain volatile lead oxide, the ceramic composition can be sintered without fluctuation of various characteristics.

Reasons for limitation of the composition in the third aspect of the present invention will now be described.

Figure 3:
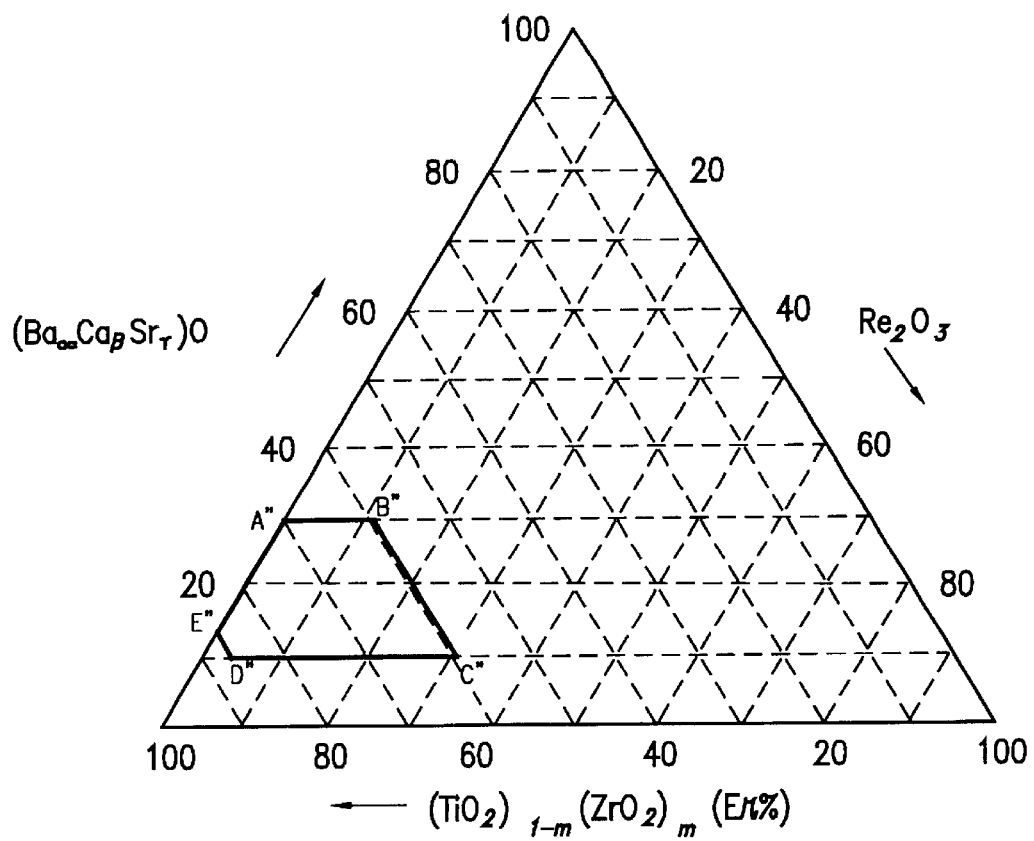
FIG. 3 is a ternary diagram showing the range of the preferable mole fraction of $(Ba_\alpha Ca_\beta Sr_\gamma)O$, $(TiO_2)_{1-m}$ $(ZrO_2)_m$, and $Re_2O_3$ in a primary constituent in a dielectric ceramic composition in accordance with a third aspect of the present invention.

As in sample Nos. 212 to 215 in Tables 15 and 18, and 229, 232, 235, 242, and 243 in Tables 16 and 19, when the mole fraction (x, y, z) of $(Ba_\alpha Ca_\beta Sr_\gamma)O$, $(TiO_2)_{1-m}(ZrO_2)_m$, and $Re_2O_3$ in the primary constituent, which is represented by the formula $x(Ba_\alpha Ca_\beta Sr_\gamma)O\text{-}y[(TiO_2)_{1-m}(ZrO_2)_m]\text{-}z Re_2O_3$ wherein x+y+z=100 on a molar basis, α+β+γ=1, 0≦β+γ<0.8, 0≦m<0.15, and Re is at least one rare earth element, does not lie within a range surrounded by point A" (30, 70, 0), point B" (30, 59, 11), point C" (10, 59, 31), point D" (10, 85, 5) and point E" (15, 85, 0) in a ternary diagram shown in FIG. 3, the dielectric specific constant is less than 60, the Q value is less than 1,000, the TCC is outside of the range of ±120 ppm/° C., or the ceramic composition cannot be sintered at a temperature which is lower than the melting point 1,083° C. of copper. Thus, the mole fraction (x, y, z) in the primary constituent preferably lies within the range surrounded by point A" (30, 70, 0), point B" (30, 59, 11), point C" (10, 59, 31), point D" (10, 85, 5) and point E" (15, 85, 0) in the ternary diagram shown in FIG. 3. When the total mole fraction x of Ba, Ca, and Sr is less than 10 as shown in sample Nos. 212 and 229, the specific dielectric constant is less than 60. When the mole fraction x exceeds 30 as shown in sample Nos. 215 and 242, the specific dielectric constant is less than 60 or the TCC is outside of the range of ±120 ppm/° C. Thus, the preferable range of x is 10≦x≦30. When the total mole fraction y of Ti and Zr is less than 59 as shown in sample Nos. 214 and 235, the composition cannot be sintered at a temperature which is lower than the melting point 1,083° C. of copper. When the total mole fraction y exceeds 85, the specific dielectric constant is less than 60, the Q value is less than 1,000, and the TCC is outside of the range of ±120 ppm/° C. Thus, the preferable range of y is 59≦y≦85.

When Ba is partly replaced with Ca and Sr as shown in sample Nos. 221 to 223, the dielectric constant increases. When the total fraction (β+γ) of Ca and Sr, however, is 0.8 or more as shown in sample No. 224, the composition cannot be sintered at 1,060° C. Thus, the preferable total fraction is in a range of 0≦β+γ<0.8.

When $TiO_2$ is partly replaced with $ZrO_2$, reduction of the oxides in the primary constituent is prevented. Thus, the ceramic composition and a copper conductor can be simultaneously sintered in a reducing atmosphere. When the $ZrO_2$ fraction m exceeds 0.15 as shown in sample No. 228, the composition cannot be sintered at 1,060° C. Thus, the preferable $ZrO_2$ fraction is in a range of 0≦m<0.15.

When the composition contains $SiO_2$-based glass not containing lead oxide as the first secondary constituent as shown in sample Nos. 217 to 219, sinterability is improved. When the glass content a is less than 0.1 parts by weight as shown in sample No. 216, the composition cannot be sintered at 1,060° C. When the glass content a exceeds 25 as shown in sample No. 220, the Q value is less than 1,000. Thus, the preferable glass content a is in a range of 0.1≦a≦25.

When the composition contains MnO as the second secondary constituent as shown in sample Nos. 227 to 229, sinterability is improved and the TCC is reduced and is shifted to the positive side. When the MnO content b is 3.0 parts by weight or less as shown in sample No. 206, the TCC is outside of the range of ±120 ppm/° C. When the Mn content b exceeds 20 parts by weight as shown in sample No. 210, the Q value is less than 1,000. Thus, the preferable Mn content b is in a range of 3.0<b≦20.

Copper oxide (CuO) as the third secondary constituent contributes to improvement in sinterability. When the CuO content c exceeds 10 parts by weight as shown in sample No. 250, the Q value is less than 1,000. Thus, the preferable CuO content c is in a range of c≦10.

Example 6

Monolithic ceramic capacitors in accordance with the third aspect of the present invention were prepared as follows.

As starting powdered materials, barium carbonate ($BaCO_3$), calcium carbonate ($CaCO_3$), strontium carbonate ($SrCO_3$), titanium oxide ($TiO_2$), zirconium oxide ($ZrO_2$), rare earth oxides ($Re_2O_3$) and manganese carbonate ($MnCO_3$) were prepared.

These powdered materials were wet-mixed with ethanol in a ball mill for 16 hours, according to the formulations for the primary constituent, the second secondary constituent, and the third secondary constituent shown in sample Nos. 261 to 264 in Table 20 to form slurries, and the slurries were dried. Each dried mixture was calcined at 1,040° C. to form a calcined powder. In Table 20, the MnO content as the second secondary constituent was represented by parts by weight to 100 parts by weight of the primary constituent $\{x(Ba_\alpha Ca_\beta Sr_\gamma)O\text{-}y[(TiO_2)_{1-m}(ZrO_2)_m]\text{-}zRe_2O_3\}$ wherein x+y+z=100 on a molar basis, α+β+γ=1, 0≦β+γ<0.8, 0≦m<0.15, and Re was at least one rare earth element.

TABLE 20

| | x(Ba$_\alpha$Ca$_\beta$Sr$_\gamma$)O-y[(TiO$_2$)$_{1-m}$(ZrO$_2$)$_m$]-zRe$_2$O$_3$ | | | | | | | First Secondary Constituent SiO$_2$ - based Glass | Second Secondary Constituent |
|---|---|---|---|---|---|---|---|---|---|
| Sample No. | x (mol %) | α | β | γ | y (mol %) | m | z (mol %) | Molar Ratio of Rare Earth Elements | Glass Type | MnO (b) Parts by Weight |
| 261 | 13 | 1 | 0 | 0 | 72 | 0 | 15 | Sm/Dy/Er = 50/20/30 | A | 5 | 4 |
| 262 | 13 | 1 | 0 | 0 | 72 | 0 | 15 | Sm/Dy/Er = 50/20/30 | B | 5 | 4 |
| 263 | 13 | 1 | 0 | 0 | 72 | 0 | 15 | Sm/Dy/Er = 50/20/30 | H | 5 | 4 |
| 264 | 13 | 1 | 0 | 0 | 72 | 0 | 15 | Sm/Dy/Er = 50/20/30 | I | 5 | 4 |

Moreover, SiO$_2$-based or B$_2$O$_3$—SiO$_2$-based glass powders of glass types A, B, H, and I were prepared as the first secondary constituents according to the formulation shown in Table 17 in which the coefficient of each oxide was represented by percent by weight.

Next, 100 parts by weight of the calcined powder and 5 parts by weight of the glass powder were mixed with a polyvinyl butyral solution to form a slurry. The slurry was spread by a doctor blade method to form green sheets.

A conductive paste layer was formed on each green sheet by printing a conductive paste primarily composed of copper to form an internal electrode. A plurality of the green sheets provided with the internal electrodes were laminated so that the conductive paste layers were alternately exposed at both side faces of the laminate, and a conductive paste primarily composed of copper was applied to both side faces of the laminate to form a green composite. The green composite was heated at 350° C. in a nitrogen atmosphere to remove the binder, and was sintered at a temperature shown in Table 21 for 2 hours in a hydrogen-nitrogen-hydrogen oxide-based reducing atmosphere to form a monolithic ceramic capacitor.

TABLE 21

| Sample No. | Sintering Temperature (° C.) | Specific Dielectric Constant 1 MHz | Q 1 MHz | TCC (ppm/° C.) |
|---|---|---|---|---|
| 261 | 1030 | 64 | 2500 | −62 |
| 262 | 1050 | 63 | 2100 | −67 |
| 263 | 1050 | 65 | 2000 | −69 |
| 264 | 1050 | 62 | 2300 | −66 |

Electrical characteristics of each ceramic capacitor were measured. The electrostatic capacitance and the Q value were measured at 20° C., a frequency of 1 MHZ, and a voltage of 1 Vrms. The sample was polished to measure the opposing area of one of the internal electrodes and the thickness of the dielectric member between the internal electrode. The specific dielectric constant (∈r) was calculated from the number of the effective dielectric ceramic layers and the electrostatic capacitance. The TCC was calculated as in Example 5.

The results are shown in Table 21.

As shown in Table 21, each of the monolithic ceramic capacitors having the compositions of sample Nos. 261 to 264 in accordance with the present invention exhibits a high specific dielectric constant of 60 or more, a Q value of 1,000 or more at 1 MHZ, and a TCC within a range of ±120 ppm/° C., and can be sintered at 1,060° C. or less which is lower than the melting point 1,083° C. of copper.

As shown in comparison of sample No. 261 with sample Nos. 262 to 264, when the first secondary constituent is a B$_2$O$_3$—SiO$_2$-based glass not containing lead oxide, sintering of the dielectric ceramic at a low temperature is facilitated.

When copper oxide as the third secondary constituent is added to the composition, the monolithic ceramic capacitor can be sintered at lower temperatures. Moreover, the ceramic capacitor not containing lead oxide exhibits stabilized characteristics.

In each of the above examples, a mixture of barium carbonate (BaCO$_3$), calcium carbonate (CaCO$_3$), strontium carbonate (SrCO$_3$), titanium oxide (TiO$_2$), zirconium oxide (ZrO$_2$), rare earth oxides (Re$_2$O$_3$), manganese carbonate (MnCO$_3$), and copper oxide (CuO) was calcined. Instead, barium carbonate (BaCO$_3$), calcium carbonate (CaCO$_3$), strontium carbonate (SrCO$_3$), titanium oxide (TiO$_2$), zirconium oxide (ZrO$_2$) and rare earth oxides (Re$_2$O$_3$) may be calcined, and then manganese carbonate (MnCO$_3$) and copper oxide (CuO) may be added.

In the present invention, the starting materials are not limited to barium carbonate (BaCO$_3$), calcium carbonate (CaCO$_3$), strontium carbonate (SrCO$_3$), titanium oxide (TiO$_2$), zirconium oxide (ZrO$_2$), rare earth oxides (Re$_2$O$_3$), manganese carbonate (MnCO$_3$) and copper oxide (CuO), and may be other compounds having different chemical formulae. Examples of other compounds which may be used as starting materials are BaTiO$_3$, Ba$_2$Ti$_9$O$_{20}$, Ba$_4$Ti13O$_{30}$, BaZrO$_3$, CaTiO$_3$, CaZrO$_3$, SrTiO$_3$, SrZrO$_3$, Re$_2$Ti$_2$O$_7$, carbonates, oxalates, hydroxides and alkoxides.

Each composition was sintered at 1,040° C. in each example, but they can also be sintered at a temperature in a range of 900° C. to 1,049° C. Although the average diameter of the calcined powder was 0.9 μm in each example, an average diameter in a range of 0.81 to 5.0 μm is also effective for obtaining the dielectric ceramic composition of the present invention.

The compositions of the SiO$_2$-based glass and the B$_2$O$_3$—SiO$_2$-based glass are not limited as long as the glass does not contain lead oxide.

A monolithic LC filter including a capacitor composed of the dielectric ceramic composition in accordance with the present invention also has the above advantages.

What is claimed is:

1. A dielectric ceramic composition comprising:
    100 parts by weight of a primary constituent;
    about 0.1 to 25 parts by weight of a first secondary constituent comprising a lead oxide free SiO$_2$-based glass; and
    more than about 0.5 up to about 20 parts by weight of a second secondary constituent comprising manganese oxide;
    wherein the primary constituent is represented by the formula x(Ba$_\alpha$Ca$_\beta$Sr$_\gamma$)O-y[(TiO$_2$)$_{1-m}$(ZrO$_2$)$_m$]-zRe$_2$O$_3$ wherein x+y+z=100 on a molar basis, α+β+γ=1, 0≦β+γ<0.8, 0≦m<0.15, and Re is at least one rare earth element, and the mole fraction (x, y, z) of (Ba$_\alpha$Ca$_\beta$Sr$_\gamma$)O, (TiO$_2$)$_{1-m}$(ZrO$_2$)$_m$, and Re$_2$O$_3$ lies within a range surrounded by point A (7, 85, 8), point B (7, 59, 34), point C (0, 59, 41), and point D (0, 85, 15) in a ternary diagram thereof but not on the line AB.

2. A dielectric ceramic composition according to claim 1, wherein the first secondary constituent comprises a lead oxide free $B_2O_3$—$SiO_2$-based glass.

3. A dielectric ceramic composition according to claim 2, further comprising about 10 parts by weight or less of copper oxide (CuO) as a third secondary constituent.

4. A dielectric ceramic composition according to claim 1, further comprising about 10 parts by weight or less of copper oxide (CuO) as a third secondary constituent.

5. A dielectric ceramic composition comprising:

100 parts by weight of a primary constituent;

about 0.1 to 25 parts by weight of a first secondary constituent comprising a lead oxide free $SiO_2$-based glass; and more than about 0.5 up to about 20 parts by weight of a second secondary constituent comprising manganese oxide;

wherein the primary constituent is represented by the formula $x(Ba_\alpha Ca_\beta Sr_\gamma)O\text{-}y[(TiO_2)_{1-m}(ZrO_2)_m]\text{-}zRe_2O_3$ wherein $x+y+z=100$ on a molar basis, $\alpha+\beta+\gamma=1$, $0 \leq \beta+\gamma<0.8$, $0 \leq m<0.15$, and Re is at least one rare earth element, and the mole fraction (x, y, z) of $(Ba_\alpha Ca_\beta Sr_\gamma)O$, $(TiO_2)_{1-m}(ZrO_2)_m$, and $Re_2O_3$ lies within a range surrounded by point A' (10, 85, 5), point B' (10, 59, 31), point C' (7, 59, 34) and point D' (7, 85, 8).

6. A dielectric ceramic composition according to claim 5, wherein the first secondary constituent comprises a lead oxide free $B_2O_3$—$SiO_2$-based glass.

7. A dielectric ceramic composition according to claim 6, further comprising about 10 parts by weight or less of copper oxide (CuO) as a third secondary constituent.

8. A dielectric ceramic composition according to claim 5, further comprising about 10 parts by weight or less of copper oxide (CuO) as a third secondary constituent.

9. A dielectric ceramic composition comprising:

100 parts by weight of a primary constituent;

about 0.1 to 25 parts by weight of a first secondary constituent comprising a lead oxide free $SiO_2$-based glass; and up to about 20 parts by weight of a second secondary constituent comprising manganese oxide;

wherein the primary constituent is represented by the formula $x(Ba_\alpha Ca_\beta Sr_\gamma)O\text{-}y[(TiO_2)_{1-m}(ZrO_2)_m]\text{-}zRe_2O_3$ wherein $x+y+z=100$ on a molar basis, $\alpha+\beta+\gamma=1$, $0 \leq \beta+\gamma<0.8$, $0 \leq m<0.15$, and Re is at least one rare earth element, and wherein the amount of the second secondary constituent is more than about 3.0 parts by weight, and wherein the mole fraction (x, y, z) of $(Ba_\alpha Ca_\beta Sr_\gamma)O$, $(TiO_2)_{1-m}(ZrO_2)_m$, and $Re_2O_3$ lies within a range surrounded by point A" (30, 70, 0), point B" (30, 59, 11), point C" (10, 59, 31), point D" (10, 85, 5) and point E" (15, 85, 0) in a ternary diagram.

10. A dielectric ceramic composition according to claim 9, wherein the first secondary constituent comprises a lead oxide free $B_2O_3$—$SiO_2$-based.

11. A dielectric ceramic composition according to claim 10, further comprising about 10 parts by weight or less of copper oxide (CuO) as a third secondary constituent.

12. A dielectric ceramic composition according to claim 9, further comprising about 10 parts by weight or less of copper oxide (CuO) as a third secondary constituent.

13. A monolithic ceramic component comprising:

a plurality of dielectric ceramic layers;

a plurality of internal electrodes each of which is between a pair of adjacent dielectric ceramic layers; and external electrodes connected to the internal electrodes;

wherein the dielectric ceramic layers comprise a dielectric ceramic composition according to claim 1, and the internal electrodes comprise Cu or Ag.

14. A monolithic ceramic component comprising:

a plurality of dielectric ceramic layers;

a plurality of internal electrodes each of which is between a pair of adjacent dielectric ceramic layers; and external electrodes connected to the internal electrodes;

wherein the dielectric ceramic layers comprise a dielectric ceramic composition according to claim 2, and the internal electrodes comprise Cu or Ag.

15. A monolithic ceramic component comprising:

a plurality of dielectric ceramic layers;

a plurality of internal electrodes each of which is between a pair of adjacent dielectric ceramic layers; and external electrodes connected to the internal electrodes;

wherein the dielectric ceramic layers comprise a dielectric ceramic composition according to claim 3, and the internal electrodes comprise Cu or Ag.

16. A monolithic ceramic component comprising:

a plurality of dielectric ceramic layers;

a plurality of internal electrodes each of which is between a pair of adjacent dielectric ceramic layers; and external electrodes connected to the internal electrodes;

wherein the dielectric ceramic layers comprise a dielectric ceramic composition according to claim 4, and the internal electrodes comprise Cu or Ag.

17. A monolithic ceramic component comprising:

a plurality of dielectric ceramic layers;

a plurality of internal electrodes each of which is between a pair of adjacent dielectric ceramic layers; and external electrodes connected to the internal electrodes;

wherein the dielectric ceramic layers comprise a dielectric ceramic composition according to claim 5, and the internal electrodes comprise Cu or Ag.

18. A monolithic ceramic component comprising:

a plurality of dielectric ceramic layers;

a plurality of internal electrodes each of which is between a pair of adjacent dielectric ceramic layers; and external electrodes connected to the internal electrodes;

wherein the dielectric ceramic layers comprise a dielectric ceramic composition according to claim 8, and the internal electrodes comprise Cu or Ag.

19. A monolithic ceramic component comprising:

a plurality of dielectric ceramic layers;

a plurality of internal electrodes each of which is between a pair of adjacent dielectric ceramic layers; and external electrodes connected to the internal electrodes;

wherein the dielectric ceramic layers comprise a dielectric ceramic composition according to claim 9, and the internal electrodes comprise Cu or Ag.

20. A monolithic ceramic component comprising:

a plurality of dielectric ceramic layers;

a plurality of internal electrodes each of which is between a pair of adjacent dielectric ceramic layers; and external electrodes connected to the internal electrodes;

wherein the dielectric ceramic layers comprise a dielectric ceramic composition according to claim 12, and the internal electrodes comprise Cu or Ag.

* * * * *